(12) United States Patent
Liu et al.

(10) Patent No.: US 11,240,531 B2
(45) Date of Patent: Feb. 1, 2022

(54) SIZE SELECTIVE APPLICATION OF DECODER SIDE REFINING TOOLS

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/324,432

(22) Filed: May 19, 2021

(65) Prior Publication Data
US 2021/0274211 A1    Sep. 2, 2021

Related U.S. Application Data

(63) Continuation of application No. PCT/CN2020/075235, filed on Feb. 14, 2020.

(30) Foreign Application Priority Data

Feb. 14, 2019   (WO) ................ PCT/CN2019/075068
Apr. 13, 2019   (WO) ................ PCT/CN2019/082585

(51) Int. Cl.
*H04N 11/02*   (2006.01)
*H04N 19/52*   (2014.01)
(Continued)

(52) U.S. Cl.
CPC .......... *H04N 19/52* (2014.11); *H04N 19/139* (2014.11); *H04N 19/176* (2014.11);
(Continued)

(58) Field of Classification Search
CPC ..................................................... H04N 19/52
(Continued)

(56) References Cited

U.S. PATENT DOCUMENTS 7,627,037 B2   12/2009   Li et al.
9,247,246 B2   1/2016    Lu et al.
(Continued)

FOREIGN PATENT DOCUMENTS

CN   101160970 A   4/2008
CN   102215386 A   10/2011
(Continued)

OTHER PUBLICATIONS

Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting, Macao, CN, Oct. 3-12, 2018, JVET-L0369, 2018.
(Continued)

*Primary Examiner* — Leron Beck
(74) *Attorney, Agent, or Firm* — Perkins Coie LLP

(57) ABSTRACT

One example method of video processing includes implementing, by a processor, a decoder-side motion vector derivation (DMVD) scheme for motion vector refinement during a conversion between a current video block and a bitstream representation of the current video block by deriving parameters based on a deriving rule. The conversion may include compressing the current video block into the bitstream representation or uncompressing the bitstream representation into pixel values of the current video block.

20 Claims, 36 Drawing Sheets

(51) Int. Cl.
*H04N 19/176* (2014.01)
*H04N 19/184* (2014.01)
*H04N 19/186* (2014.01)
*H04N 19/139* (2014.01)
*H04N 19/577* (2014.01)

(52) U.S. Cl.
CPC ......... *H04N 19/184* (2014.11); *H04N 19/186* (2014.11); *H04N 19/577* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 9,294,777 B2 | 3/2016 | Wang | |
| 9,521,425 B2 | 12/2016 | Chen et al. | |
| 9,641,852 B2 | 5/2017 | Lu et al. | |
| 9,667,996 B2 | 5/2017 | Chen et al. | |
| 9,762,927 B2 | 9/2017 | Chen et al. | |
| 9,832,351 B1 | 11/2017 | Schoenblum | |
| 9,838,712 B2 | 12/2017 | Lin et al. | |
| 10,523,964 B2 | 12/2019 | Chuang et al. | |
| 10,645,382 B2 | 5/2020 | Zhang et al. | |
| 10,764,592 B2 | 9/2020 | Zhang et al. | |
| 10,779,002 B2 | 9/2020 | Chen et al. | |
| 2009/0003446 A1* | 1/2009 | Wu | H04N 19/587 375/240.16 |
| 2009/0175334 A1* | 7/2009 | Ye | H04N 19/46 375/240.12 |
| 2009/0268823 A1* | 10/2009 | Dane | H04N 19/132 375/240.27 |
| 2010/0157078 A1 | 6/2010 | Atanassov et al. | |
| 2010/0284466 A1 | 11/2010 | Pandit et al. | |
| 2014/0286408 A1 | 9/2014 | Zhang et al. | |
| 2015/0181216 A1 | 6/2015 | Zhang et al. | |
| 2017/0339405 A1* | 11/2017 | Wang | H04N 19/593 |
| 2018/0041769 A1* | 2/2018 | Chuang | H04N 19/573 |
| 2018/0184117 A1* | 6/2018 | Chen | H04N 19/109 |
| 2018/0192071 A1* | 7/2018 | Chuang | H04N 19/517 |
| 2018/0199057 A1* | 7/2018 | Chuang | H04N 19/533 |
| 2018/0241998 A1* | 8/2018 | Chen | H04N 19/139 |
| 2018/0278949 A1* | 9/2018 | Karczewicz | H04N 19/587 |
| 2018/0278950 A1* | 9/2018 | Chen | H04N 19/176 |
| 2018/0332298 A1* | 11/2018 | Liu | H04N 19/105 |
| 2019/0020895 A1* | 1/2019 | Liu | H04N 19/176 |
| 2019/0132606 A1* | 5/2019 | Su | H04N 19/176 |
| 2019/0222848 A1* | 7/2019 | Chen | H04N 19/176 |
| 2019/0230350 A1* | 7/2019 | Chen | H04N 19/573 |
| 2019/0306502 A1 | 10/2019 | Gadde et al. | |
| 2020/0036997 A1* | 1/2020 | Li | H04N 19/521 |
| 2020/0128258 A1* | 4/2020 | Chen | H04N 19/533 |
| 2020/0344475 A1 | 10/2020 | Zhu et al. | |
| 2020/0374544 A1 | 11/2020 | Liu et al. | |
| 2020/0382795 A1 | 12/2020 | Zhang et al. | |
| 2020/0396453 A1 | 12/2020 | Zhang et al. | |
| 2021/0029362 A1 | 1/2021 | Liu et al. | |
| 2021/0051339 A1 | 2/2021 | Liu et al. | |
| 2021/0076063 A1 | 3/2021 | Liu et al. | |
| 2021/0092435 A1 | 3/2021 | Liu et al. | |
| 2021/0274212 A1 | 9/2021 | Liu et al. | |

FOREIGN PATENT DOCUMENTS

| | | |
|---|---|---|
| CN | 102970543 A | 3/2013 |
| CN | 105103556 A | 11/2015 |
| CN | 107431820 A | 12/2017 |
| CN | 107690810 A | 2/2018 |
| CN | 107710764 A | 2/2018 |
| WO | 2007108661 A1 | 9/2007 |
| WO | 2018113658 A1 | 6/2018 |
| WO | 2018117546 A1 | 6/2018 |
| WO | 2018156628 A1 | 8/2018 |
| WO | 2018175720 A1 | 9/2018 |
| WO | 2018175756 A1 | 9/2018 |
| WO | 2018199050 A1 | 11/2018 |

OTHER PUBLICATIONS

Non Final Office Action from U.S. Appl. No. 17/324,482 dated Sep. 1, 2021.

Bross et al. "Versatile Video Coding (Draft 2), "Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Chen et al. "Algorithm Description of Joint Exploration Test Model 7 (JEM 7)," Joint Video Exploration Team (JVET) of ITU-T SG WP 3 and ISO/IEC JTC 1/SC 29/WG 11, 7th Meeting, Torino, IT, Jul. 13-21, 2017, document JVET-G1001, 2017.

Chen et al.CE4: Affine Merge Enhancement with Simplification (Test 4.2.2), Joint Video Experts Team (JVET) of ITU-/T SG 16 WP 3 and ISO/IEC JTC 1/SC 29/WG 11, 12th Meeting, Macao, CN, 3-12, Oct. 2018, document JVET-L0368, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

Chen et al. "CE4: Symmetrical MVD Mode (Test 4.4.3)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0481, 2019.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting, Ljubljana, SI, 10-18, Jul. 2018, document JVET-K0337, 2018.

"Information Technology—High Efficiency Coding and Media Delivery in Heterogeneous Environments—Part 2: High Efficiency Video Coding" Apr. 20, 2018, ISO/DIS 23008, 4th Edition.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.

Sethuraman, Sriram. "CE9: Results of DMVR Related Tests CE9.2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.

Sethuraman, Sriram, "Non-CE9: Co-Existence Analysis for DMVR with BDOF," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0223, 2019.

Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVE-K1024, 2018.

JEM-7.0:https://jvet.hhi.fraunhofer.de/svn/svn_HMJEMSoftware/tags/HM-16.6-JEM-7.0.

https://vcgit.hhi.fraunhofer.de/jvet/VVCSoftware_VTM/tags/VTM-2.1.

(56) References Cited

OTHER PUBLICATIONS

International Search Report and Written Opinion from International Patent Application No. PCT/CN2020/075226 dated May 8, 2020 (10 pages).
International Search Report and Written Opinion from International Patent Application No. PCT/CN2020/075232 dated Apr. 29, 2020 (10 pages).
International Search Report and Written Opinion from International Patent Application No. PCT/CN2020/075235 dated May 8, 2020 (11 pages).
International Search Report and Written Opinion from International Patent Application No. PCT/CN2020/075238 dated Apr. 26, 2020 (11 pages).

* cited by examiner (b) second PU of 2N×N (a) second PU of N×2N

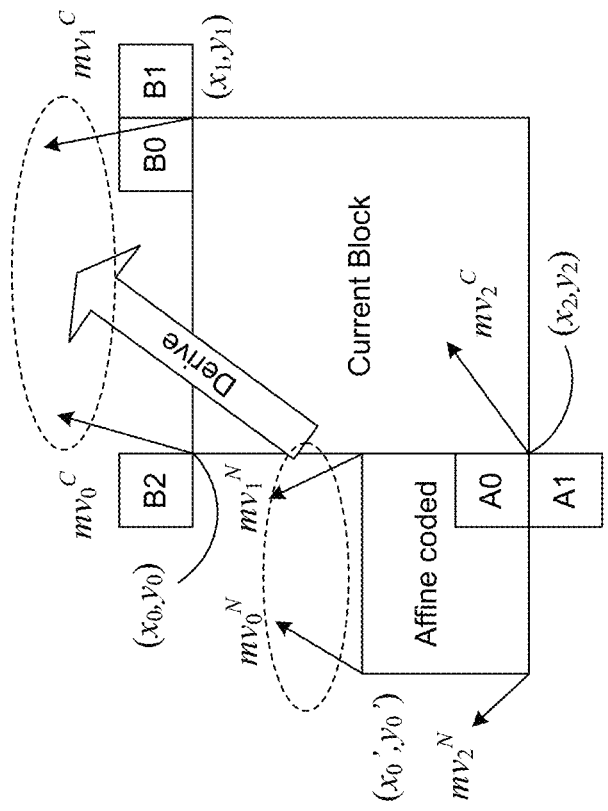
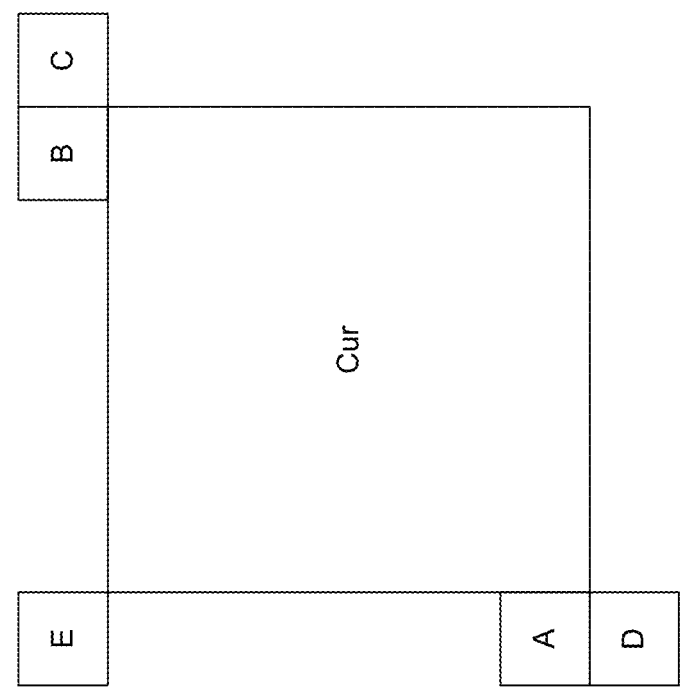
FIG. 16B
FIG. 16A

2470

2472 — Determining whether to enable or disable a decoder-side motion vector derivation (DMVD) scheme for a plurality of components of a current video block of a video 2474 — Obtaining, after the determining that the DMVD scheme is enabled, a refined motion information for the current video block by implementing the DMVD scheme 2476 — Performing, during the implementing of the DMVD scheme, a conversion between the current video block and a bitstream representation of the video

FIG. 24H

SIZE SELECTIVE APPLICATION OF DECODER SIDE REFINING TOOLS

CROSS REFERENCE TO RELATED APPLICATIONS

This application is a continuation of International Patent Application No. PCT/CN2020/075235, filed on Feb. 14, 2020, which claims the priority to and benefits of International Patent Application No. PCT/CN2019/075068, filed on Feb. 14, 2019, and International Patent Application No. PCT/CN2019/082585, filed on Apr. 13, 2019. All the aforementioned patent applications are hereby incorporated by reference in their entireties.

TECHNICAL FIELD

The present document relates to video and image coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses video coding tools that, in one example aspect, improve coding efficiency of current coding tools related to ultimate motion vector expression or generalized bi-prediction.

A first example video processing method comprises obtaining a refined motion information for a current video block of a video by implementing a decoder-side motion vector derivation (DMVD) scheme based on at least a weight parameter, where the weight parameter is applied to prediction blocks in a generation process for a final prediction block for the current video block, and performing a conversion between the current video block and a bitstream representation of the video at least using the refined motion information and the weight parameter.

A second example video processing method comprises determining that use of a decoder-side motion vector derivation (DMVD) scheme is disabled for a conversion between a current video block of a video and a coded representation of the video due to use of a coding tool for the current video block, and performing the conversion between the current video block and a bitstream representation of the video based on the determining, where the coding tool includes applying unequal weighting factors to prediction blocks of the current video block.

A third example video processing method comprises determining, based on picture order count (POC) values of one or more reference pictures of a current video block of a video and a POC value of a current picture containing the current video block, whether to enable or disable one or more decoder-side motion vector derivation (DMVD) schemes for the current video block, and performing, according to the determining, a conversion between the current video block and a bitstream representation of the video.

A fourth example video processing method comprises obtaining a refined motion information for a current video block of a video by implementing a decoder-side motion vector derivation (DMVD) scheme for the current video block where a symmetric motion vector difference (SMVD) mode is enabled for the current video block, and performing a conversion between the current video block and a bitstream representation of the video using the refined motion information.

A fifth example video processing method comprises determining, based on a field in a bitstream representation for a video including a current video block, whether to enable or disable a decoder-side motion vector derivation (DMVD) scheme for the current video block, where a symmetric motion vector difference (SMVD) mode is enabled for the current video block, obtaining, after the determining that the DMVD scheme is enabled, a refined motion information for the current video block by implementing the DMVD scheme for the current video block, and performing a conversion between the current video block and a bitstream representation of the video using the refined motion information.

A sixth example video processing method comprises determining, based on a rule that uses a block dimension of a current video block of a video, whether a plurality of decoder-side motion vector derivation (DMVD) schemes are enabled or disabled for a conversion between the current video block and a bitstream representation of the video, and performing the conversion based on the determination.

A seventh example video processing method comprises determining whether to perform a plurality of decoder-side motion vector derivation (DMVD) schemes at a sub-block level or a block level for a current video block of a video, obtaining, after the determining that the plurality of DMVD schemes are performed at a sub-block level, a refined motion information for the current video block by implementing the plurality of DMVD schemes at a same sub-block level for the current video block, and performing a conversion between the current video block and a bitstream representation of the video using the refined motion information.

An eighth example video processing method comprises determining whether to enable or disable a decoder-side motion vector derivation (DMVD) scheme for a plurality of components of a current video block of a video, obtaining, after the determining that the DMVD scheme is enabled, a refined motion information for the current video block by implementing the DMVD scheme, and performing, during the implementing of the DMVD scheme, a conversion between the current video block and a bitstream representation of the video.

In another example aspect, the above-described method and the methods described in this patent document may be implemented by a video encoder apparatus or a video decoder apparatus that comprises a processor.

In another example aspect, the above-described method and the methods described in this patent document may be stored in the form of processor-executable instructions on a non-transitory computer-readable program medium.

These, and other, aspects are further described in the present document.

BRIEF DESCRIPTION OF DRAWINGS

FIG. 16A-16B shows examples of Candidates for AF_MERGE.

FIGS. 24A to 24H are eight example flowcharts for example methods of video processing.

DETAILED DESCRIPTION

Figure 1:
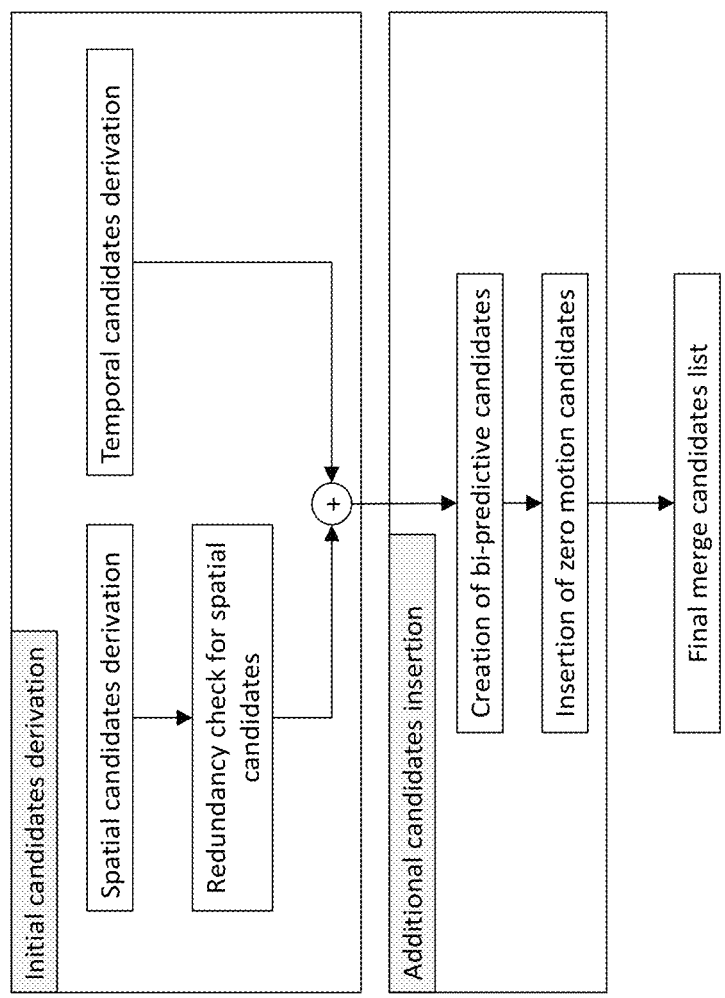
FIG. 1 shows example derivation process for merge candidates list construction.

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This invention is related to video coding technologies. Specifically, it is related to the interaction of unequal weights applied to prediction blocks and motion vector refinement in video coding. It may be applied to the existing video coding standard like High Efficiency Video Coding HEVC, or the standard (Versatile Video Coding) to be finalized. It may be also applicable to future video coding standards or video codec.

2. Brief Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 2) could be found at: http://phenix.it-sudparis.eu/jvet/doc_end_user/documents/11_Ljubljana/wg11/JVET-K1001-v7.zip. The latest reference software of VVC, named VTM, could be found at: https://vcgit.hhi.fraunhofer.de/jvet/VVCSoftware_VTM/tags/VTM-2.1

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

FIG. 1 shows example derivation process for merge candidates list construction.

2.1.2.2 Spatial Candidates Derivation

Figure 2:
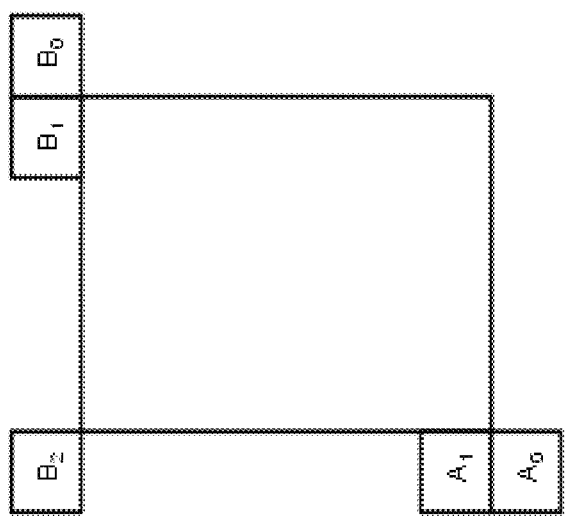
FIG. 2 shows example positions of spatial merge candidates.
Figure 3:
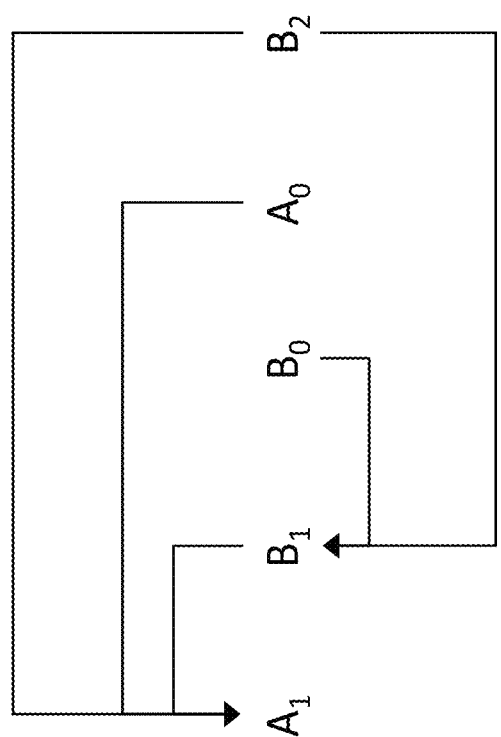
FIG. 3 shows examples of candidate pairs considered for redundancy check of spatial merge candidates.
Figures 4A, 4B:
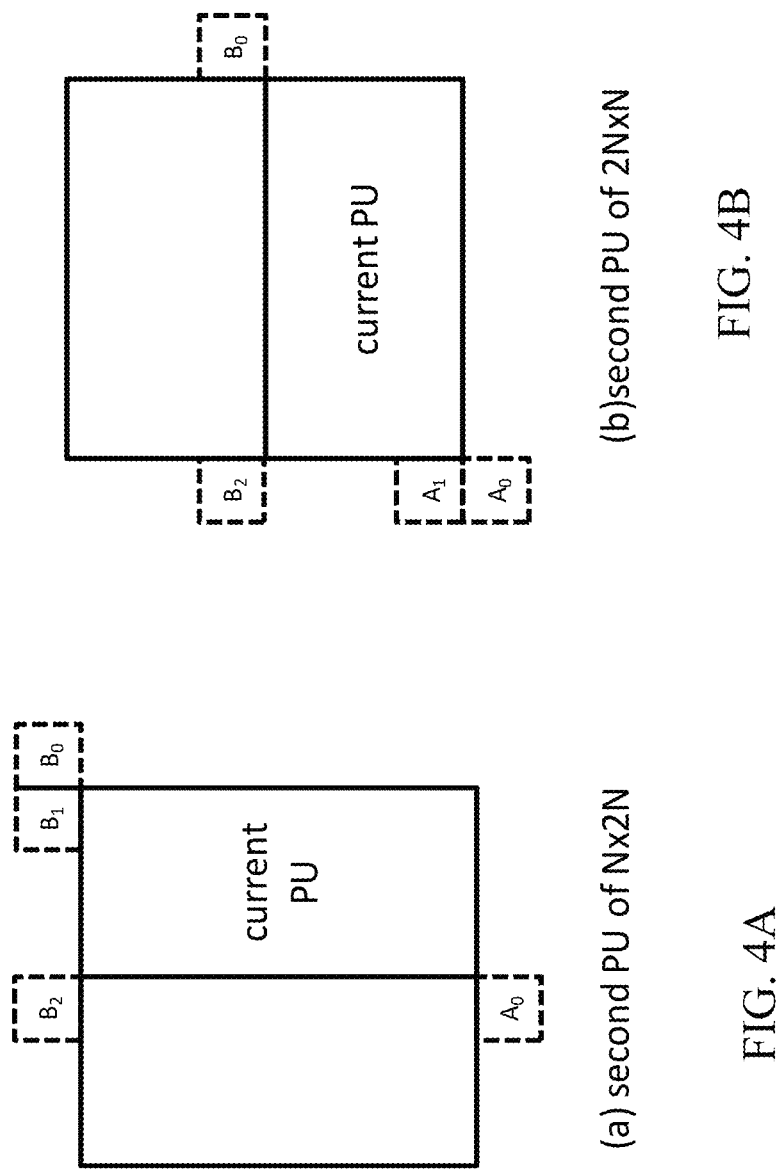
FIGS. 4A-4B show example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A-4B depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

FIG. 2 shows example positions of spatial merge candidates.

FIG. 3 shows examples of candidate pairs considered for redundancy check of spatial merge candidates.

FIGS. 4A-4B show example positions for the second PU of N×2N and 2N×N partitions.

2.1.2.3 Temporal Candidates Derivation

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 5:
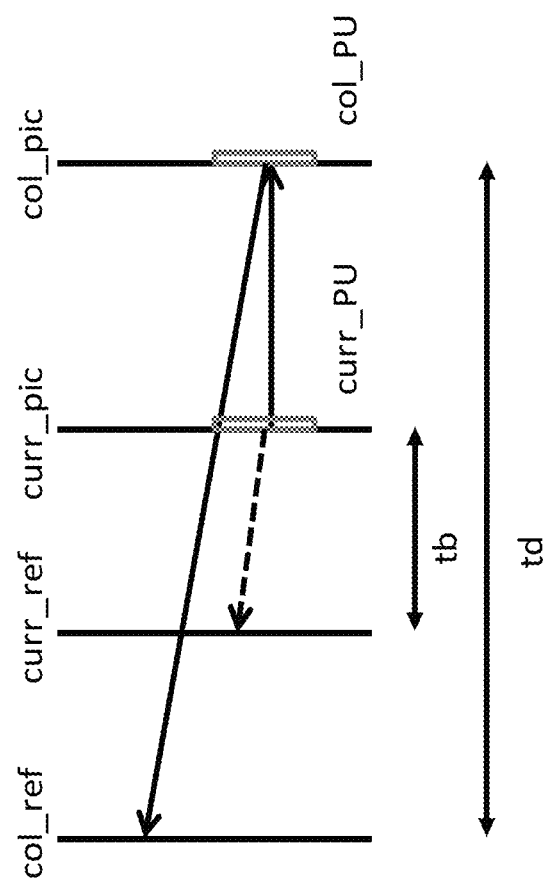
FIG. 5 is an illustration of motion vector scaling for temporal merge candidate.

FIG. 5 is an illustration of motion vector scaling for temporal merge candidate.

Figure 6:
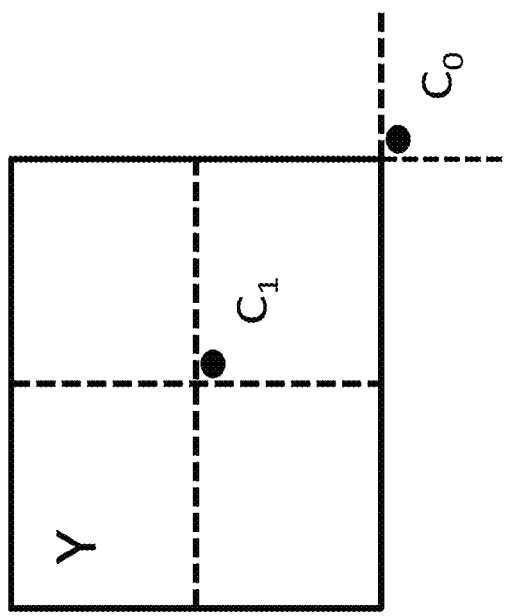
FIG. 6 shows an example of candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU aka. LCU, largest coding unit) row, position $C_1$ is used. Otherwise, position $C_0$ is used in the derivation of the temporal merge candidate.

FIG. 6 shows an example of candidate positions for temporal merge candidate, C0 and C1.

2.1.2.4 Additional Candidates Insertion

Figure 7:
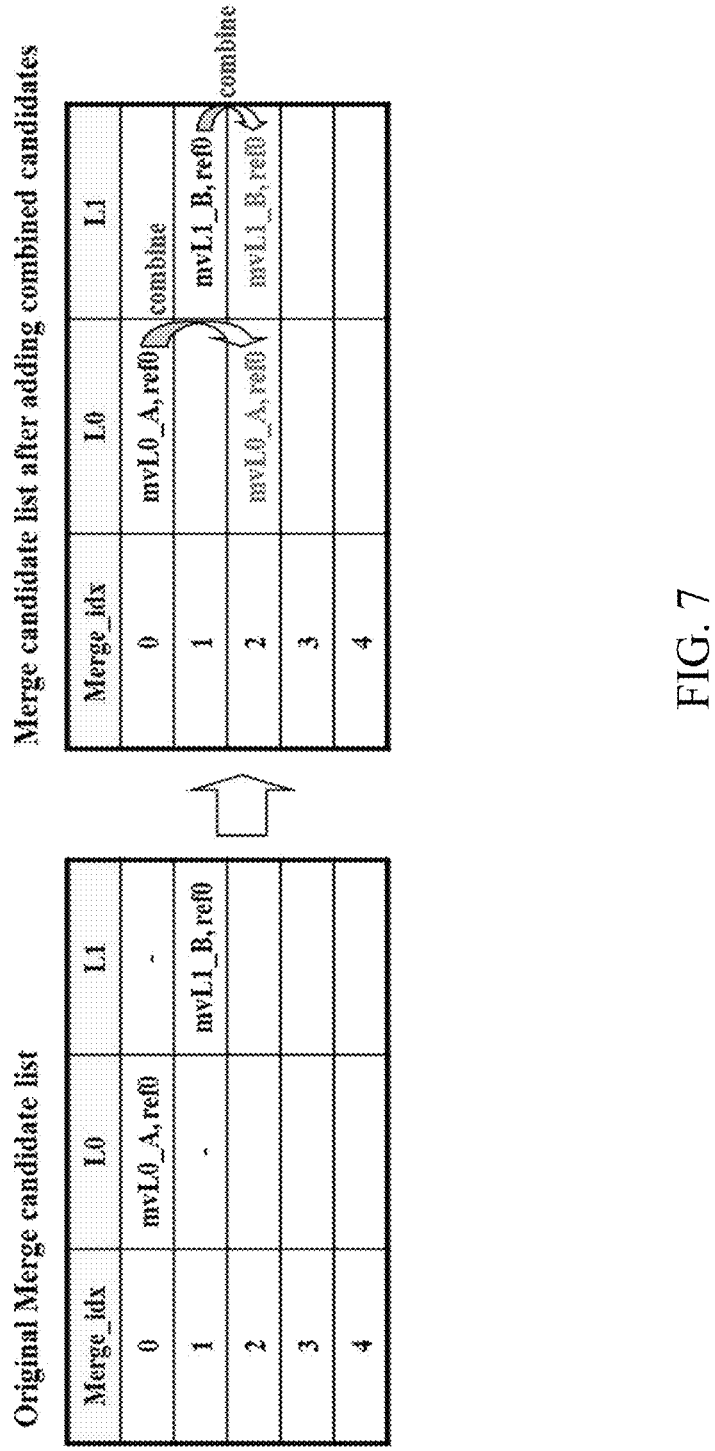
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

FIG. 7 shows an example of combined bi-predictive merge candidate.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
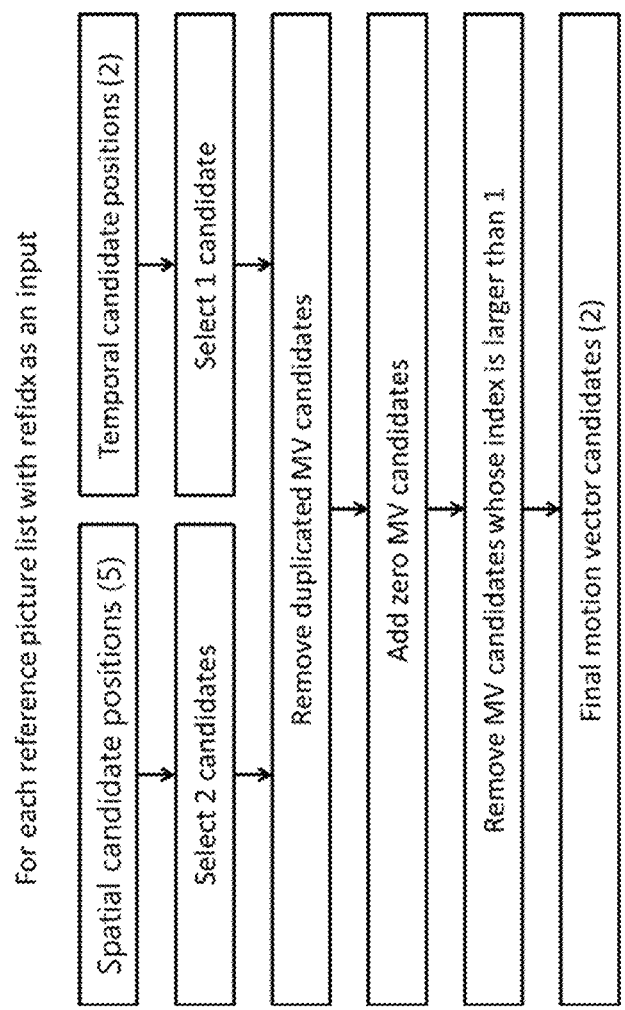
FIG. 8 summarizes derivation process for motion vector prediction candidate.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
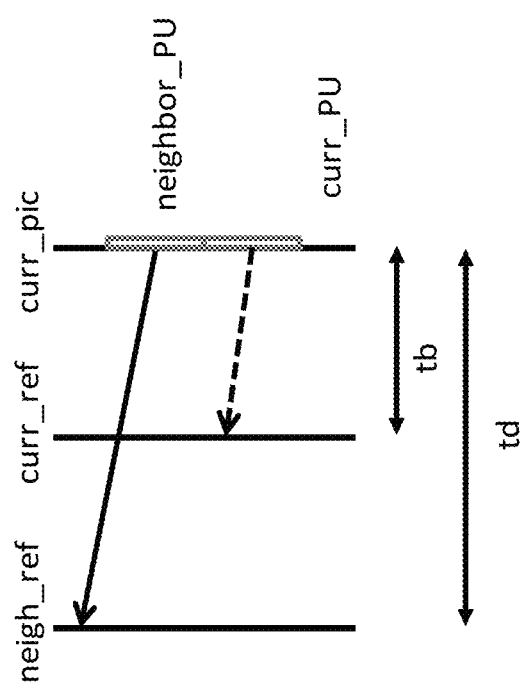
FIG. 9 shows an illustration of motion vector scaling for spatial motion vector candidate.

FIG. 9 shows an illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Local Illumination Compensation in JEM

Local Illumination Compensation (LIC) is based on a linear model for illumination changes, using a scaling factor a and an offset b. And it is enabled or disabled adaptively for each inter-mode coded coding unit (CU).

Figure 10:
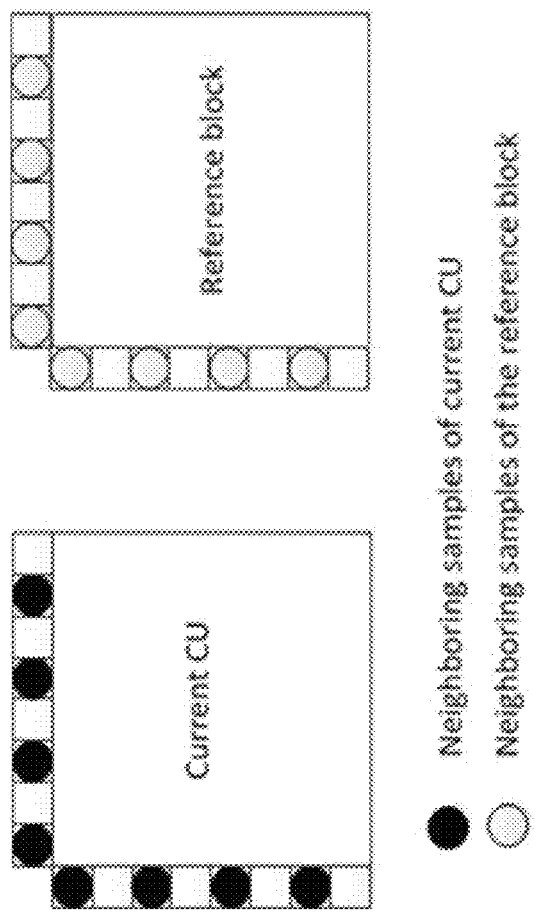
FIG. 10 shows examples of neighbouring samples used for deriving illumination compensation (IC) parameters.

FIG. 10 shows examples of neighbouring samples used for deriving IC parameters.

Figure 12:
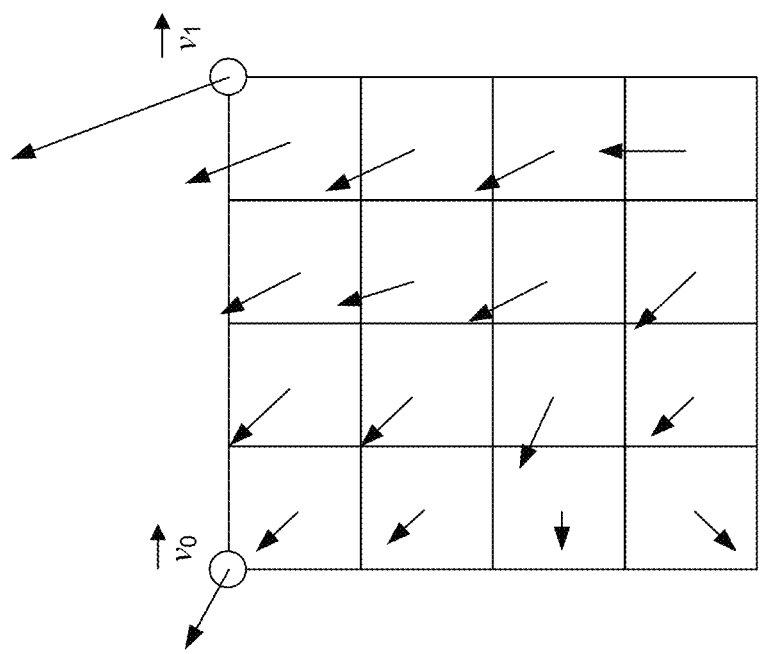
FIG. 12 shows an example of Affine motion vector field (MVF) per sub-block.

When LIC applies for a CU, a least square error method is employed to derive the parameters a and b by using the neighbouring samples of the current CU and their corresponding reference samples. More specifically, as illustrated in FIG. 12, the subsampled (2:1 subsampling) neighbouring samples of the CU and the corresponding samples (identified by motion information of the current CU or sub-CU) in the reference picture are used.

2.2.1 Derivation of Prediction Blocks

The IC parameters are derived and applied for each prediction direction separately. For each prediction direction, a first prediction block is generated with the decoded motion information, then a temporary prediction block is obtained via applying the LIC model. Afterwards, the two temporary prediction blocks are utilized to derive the final prediction block.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.3 Inter Prediction Methods in VVC

There are several new coding tools for inter prediction improvement, such as Adaptive motion vector difference resolution (AMVR) for signaling MVD, affine prediction mode, Triangular prediction mode (TPM), Advanced TMVP (ATMVP, aka SbTMVP), Generalized Bi-Prediction (GBI), Bi-directional Optical flow (BIO or BDOF).

2.3.1 Coding Block Structure in VVC

In VVC, a QuadTree/BinaryTree/MulitpleTree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

2.3.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.3.3 Affine Motion Compensation Prediction

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 13, the affine motion field of the block is described by two control point motion vectors (CPMVs) for the 4-parameter affine model and 3 CPMVs for the 6-parameter affine model.

Figure 11A:
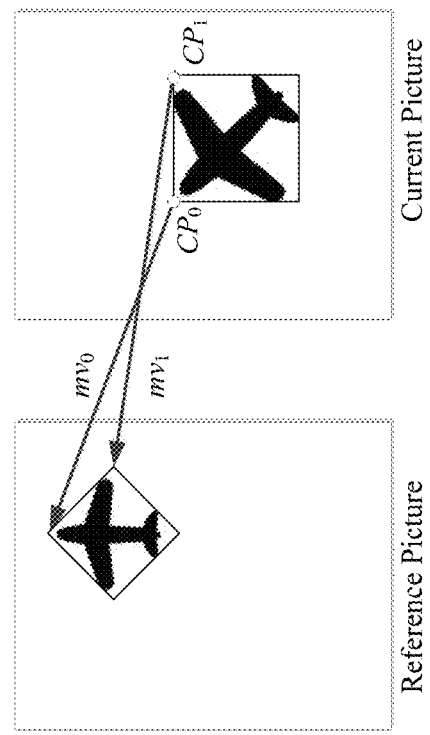
FIGS. 11A-11B show simplified affine motion model for 4-parameter affine and 6 parameter affine modes respectively.
Figure 11B:
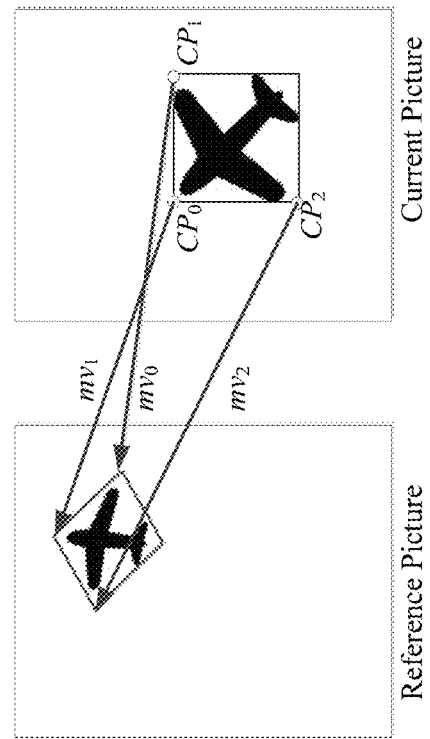

FIGS. 11A-11B show simplified affine motion model for 4-parameter affine and 6 parameter affine modes respectively.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 14:
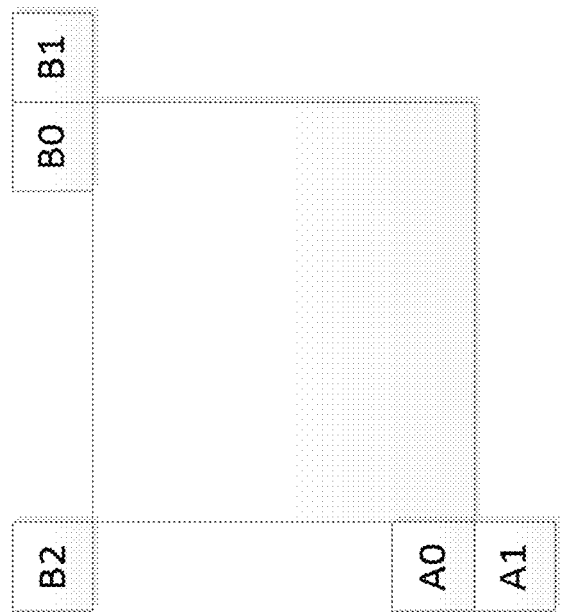
FIG. 14 shows a motion vector predictor (MVP) for AF_INTER for inherited affine candidates.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 14, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

FIG. 12 shows an example of Affine MVF per sub-block.

After MCP, the high accuracy motion vector of each sub-block is rounded and saved as the same accuracy as the normal motion vector.

2.3.3.1 Signaling of Affine Prediction

Similar to the translational motion model, there are also two modes for signaling the side information due affine prediction. They are AFFINE_INTER and AFFINE_MERGE modes.

2.3.3.2 AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 17) and the estimated CPMVs are signalled. In addition, the index of affine AMVP candidate from which the estimated CPMVs are derived is further signalled.

1) Inherited Affine Motion Predictors

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 16.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 17 are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 17:
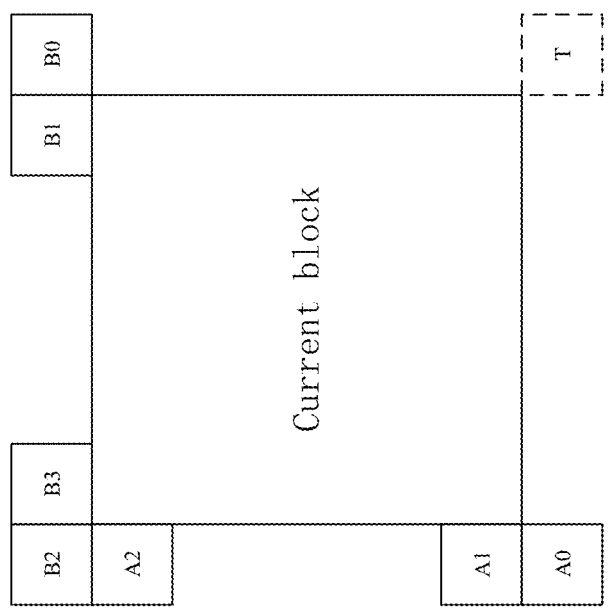
FIG. 17 shows examples of Candidates position for affine merge mode.

A constructed affine motion predictor consists of control-point motion vectors (CPMVs) that are derived from neighboring inter coded blocks, as shown in FIG. 17, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_i$ is already derived in constructed affine motion predictor.

Figure 13B:
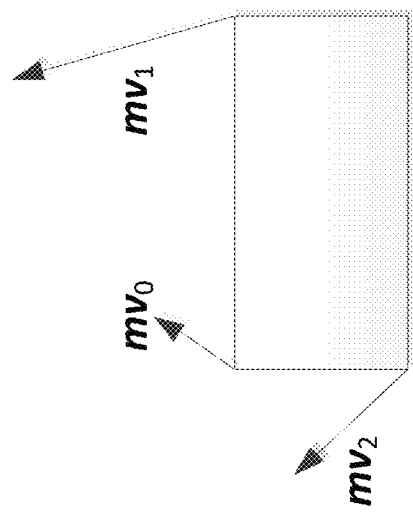
FIGS. 13A-13B show examples of 4-parameter affine model and 6-parameter affine model, respectively.
Figure 13A:
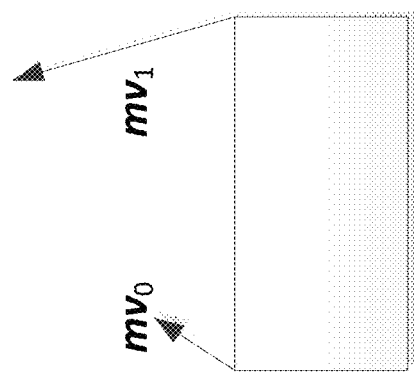

FIGS. 13A-B show examples of 4-parameter affine model and 6-parameter affine model, respectively.

FIG. 14 shows an MVP for AF_INTER for inherited affine candidates.

Figure 15:
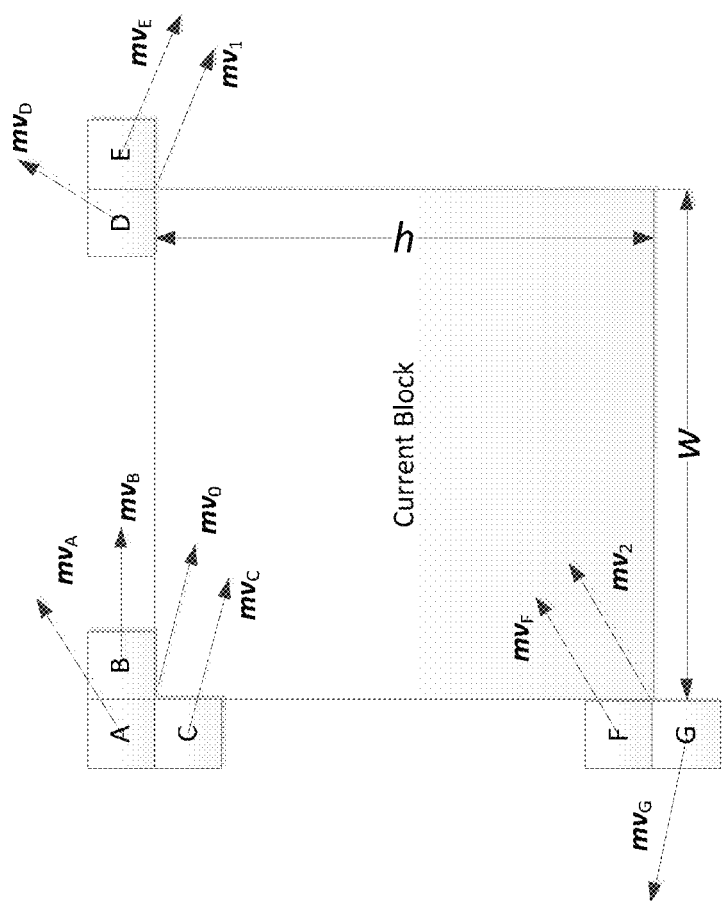
FIG. 15 shows an MVP for AF_INTER for constructed affine candidates.

FIG. 15 shows an MVP for AF_INTER for constructed affine candidates.

FIG. 16A-16B show examples of Candidates for AF_MERGE.

In AF_INTER mode, when ⅘-parameter affine mode is used, ⅔ control points are required, and therefore ⅔ MVD needs to be coded for these control points, as shown in FIG. 15. In JVET-K0337, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 15B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.3.3.3 AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 17 (denoted by A, B, C, D, E in order). For example, if the neighbour left bottom block is coded in affine mode as denoted by A0 in FIG. 17, element B, the Control Point (CP) motion vectors $mv_0^N$, $mv_1^N$ and $mv_2N$ of the top left corner, above right corner and left bottom corner of the neighbouring CU/PU which contains the block A are fetched. And the motion vector $mv_0^C$, $mv_1^C$ and $mv_2c$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2c$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

In JVET-L0142 and JVET-L0632, an affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

Figure 19:
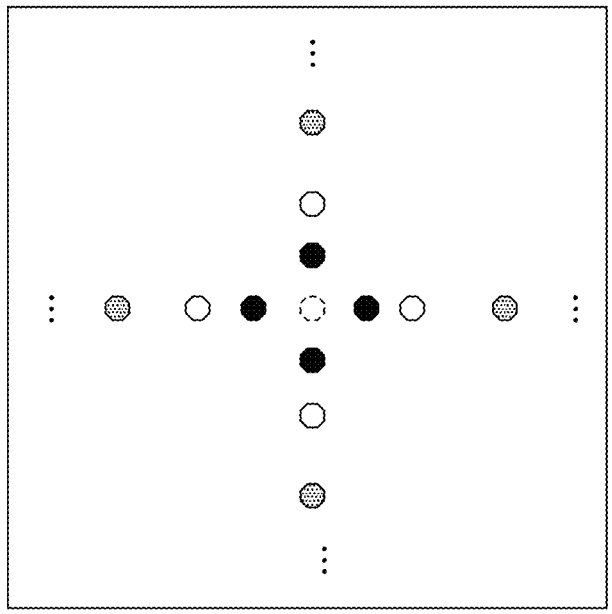
FIG. 19 shows an example of a UMVE Search Point.
Figure 19:
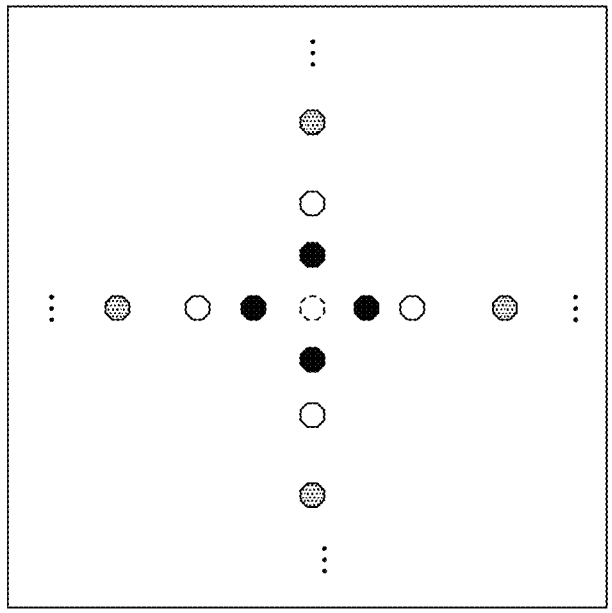

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 19. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

FIG. 17 shows examples of Candidates position for affine merge mode.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is $B_1$→B0.

For CP3, the checking priority is A1→A0.

For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

III. The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.3.4 Merge with Motion Vector Differences (MMVD)

In JVET-L0054, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 18:
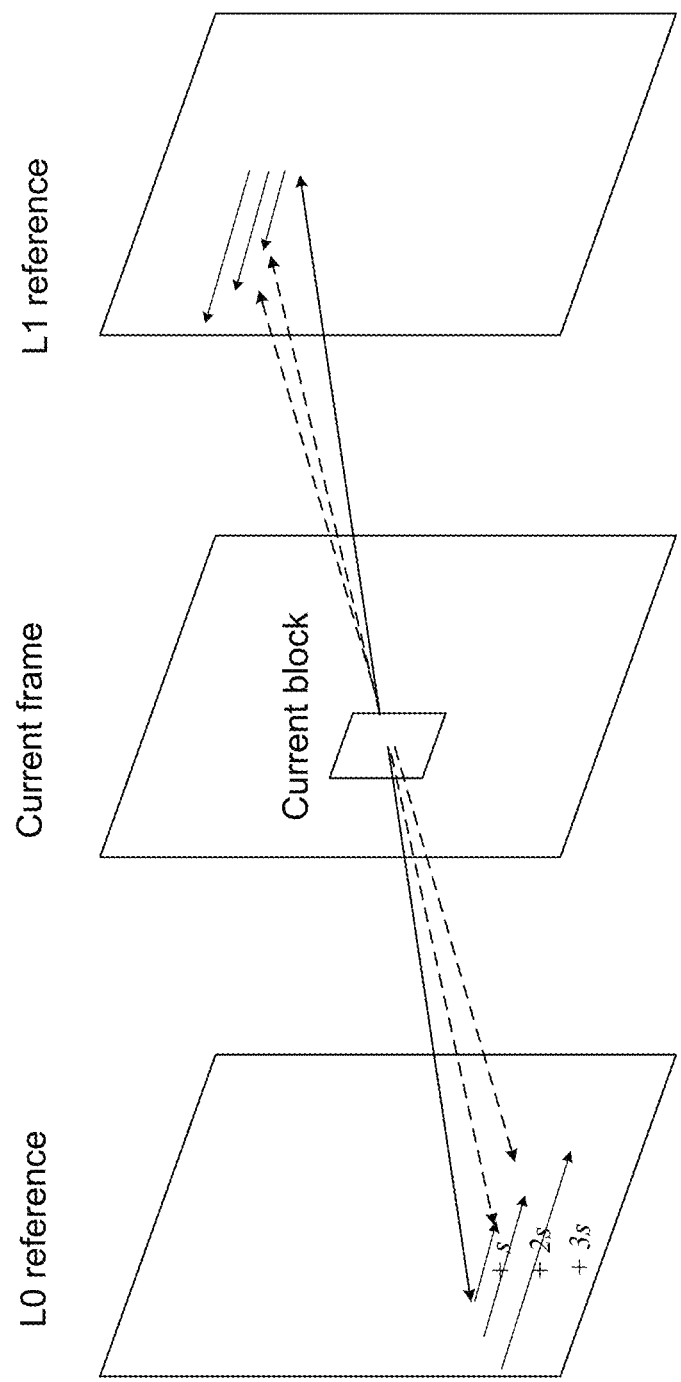
FIG. 18 shows an example of a ultimate motion vector expression (UMVE) Search Process.

FIG. 18 shows an example of a UMVE Search Process.

FIG. 19 shows an example of a UMVE Search Point.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.3.5 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

2.3.5.1 DMVR in JEM

Figure 22:
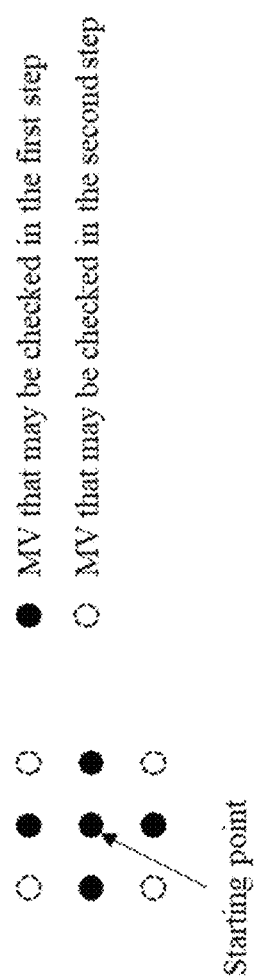
FIG. 22 shows an example of MVs that may be checked in one iteration.

In JEM design, the motion vectors are refined by a bilateral template matching process. The bilateral template matching applied in the decoder to perform a distortion-based search between a bilateral template and the reconstruction samples in the reference pictures in order to obtain a refined MV without transmission of additional motion information. An example is depicted in FIG. 22. The bilateral template is generated as the weighted combination (i.e. average) of the two prediction blocks, from the initial MV0 of list0 and MV1 of list1, respectively, as shown in FIG. 22. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 22, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

Figure 20:
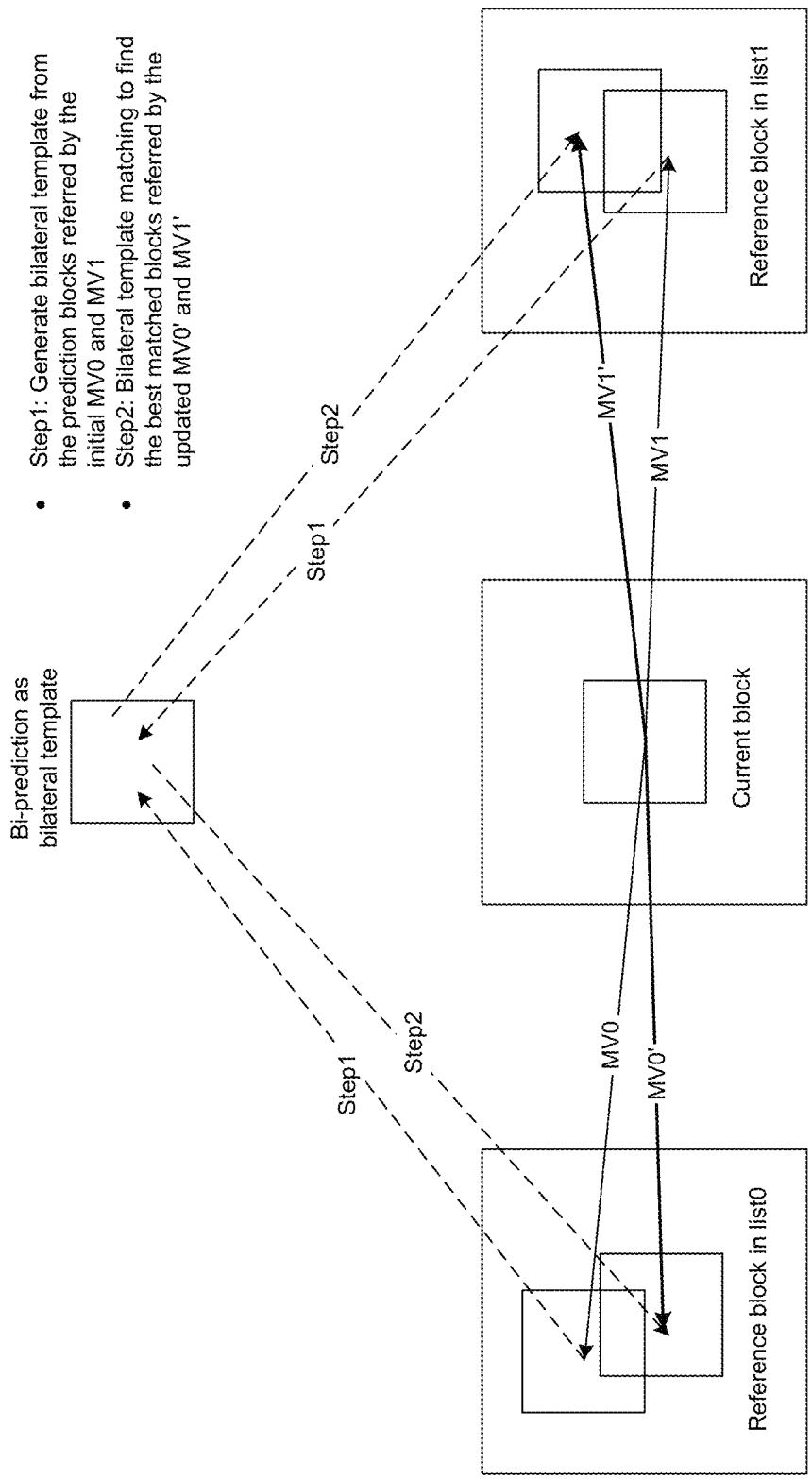
FIG. 20 shows an example of decoder side motion vector refinement (DMVR) based on bilateral template matching.

FIG. 20 shows an example of DMVR based on bilateral template matching.

2.3.5.2 DMVR in VVC

Figure 21:
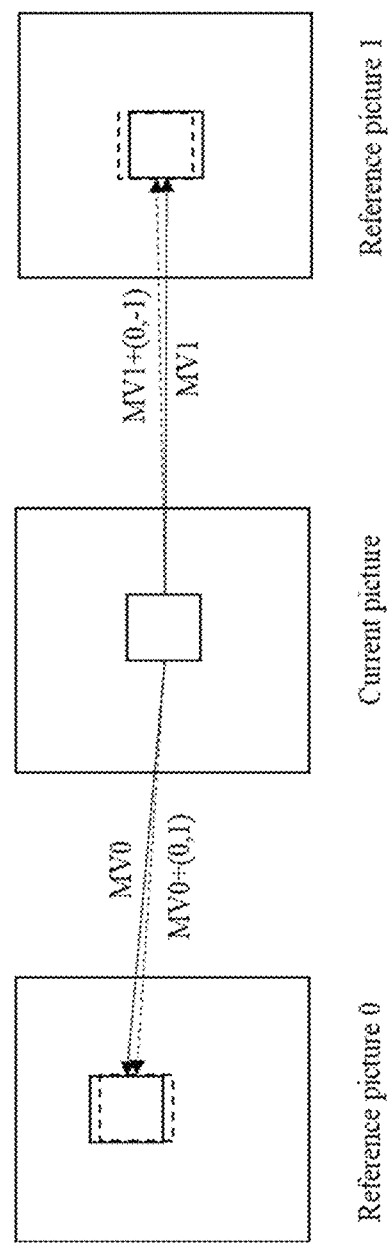
FIG. 21 shows an example of motion vector difference MVD (0, 1) mirrored between list 0 and list 1 in DMVR.

For DMVR in VVC, MVD mirroring between list 0 and list 1 is assumed as shown in FIG. 21, and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in the list 1 reference picture.

The motion vector refinement process may iterate twice. In each iteration, at most 6 MVDs (with integer-pel precision) may be checked in two steps, as shown in FIG. 22. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:

MvdX=−1;
MvdY=−1;
If (Sad(1, 0)<Sad(−1, 0))
 MvdX=1;
If (Sad(0, 1)<Sad(0, −1))
 MvdY=1;

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

FIG. 21 shows an example of MVD (0, 1) mirrored between list 0 and list 1 in DMVR.

FIG. 22 shows an example of MVs that may be checked in one iteration.

To further simplify the process of DMVR, JVET-M0147 proposed several changes to the design in JEM. More specifically, the adopted DMVR design to VTM-4.0 (to be released soon) has the following main features:

Early termination when (0,0) position SAD between list0 and list1 is smaller than a threshold.
Early termination when SAD between list0 and list1 is zero for some position.
Block sizes for DMVR: W*H>=64 && H>=8, wherein W and H are the width and height of the block.
Split the CU into multiple of 16×16 sub-blocks for DMVR of CU size>16*16. If only width or height of the CU is larger than 16, it is only split in vertical or horizontal direction.
Reference block size (W+7)*(H+7) (for luma).
25 points SAD-based integer-pel search (i.e. (+−) 2 refinement search range, single stage)
Bilinear-interpolation based DMVR.
"Parametric error surface equation" based sub-pel refinement. This procedure is performed only when the minimum SAD cost is not equal to zero and the best MVD is (0, 0) in the last MV refinement iteration.
Luma/chroma MC w/reference block padding (if needed).
Refined MVs used for MC and TMVPs only.

2.3.5.2.1 Usage of DMVR

When the following conditions are all true, DMVR may be enabled:
DMVR enabling flag in the SPS (i.e., sps_dmvr_enabled_flag) is equal to 1

TPM flag, inter-affine flag and subblock merge flag (either ATMVP or affine merge), MMVD flag are all equal to 0

Merge flag is equal to 1

Current block is bi-predicted, and POC distance between current picture and reference picture in list 1 is equal to the POC distance between reference picture in list 0 and current picture The current CU height is greater than or equal to 8

Number of luma samples (CU width*height) is greater than or equal to 64

2.3.5.2.2 "Parametric Error Surface Equation" Based Sub-Pel Refinement

The method is summarized below:
1. The parametric error surface fit is computed only if the center position is the best cost position in a given iteration.
2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where $(x_0,y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E(0,1))/(2((E(0,-1)+E(0,1)-2E(0,0)))$$

$(x_0, y_0)$ can be computed to any required sub-pixel precision by adjusting the precision at which the division is performed (i.e. how many bits of quotient are computed). For $1/16^{th}$-pel accuracy, just 4-bits in the absolute value of the quotient needs to be computed, which lends itself to a fast shifted subtraction based implementation of the 2 divisions required per CU.

3. The computed $(x_0, y_0)$ are added to the integer distance refinement MV to get the sub-pixel accurate refinement delta MV.

2.3.6 Combined Intra and Inter Prediction

In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$) (2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

2.3.7. Symmetric Motion Vector Difference in JVET-M0481

In JVET-M0481, symmetric motion vector difference (SMVD) is proposed for motion information coding in bi-prediction.

Firstly, in slice level, variables BiDirPredFlag, RefIdxSymL0 and RefIdxSymL1 are derived as follows:

The forward reference picture in reference picture list 0 which is nearest to the current picture is searched. If found, RefIdxSymL0 is set equal to the reference index of the forward picture.

The backward reference picture in reference picture list 1 which is nearest to the current picture is searched. If found, RefIdxSymL1 is set equal to the reference index of the backward picture.

If both forward and backward picture are found, BiDirPredFlag is set equal to 1.

Otherwise, following applies:

The backward reference picture in reference picture list 0 which is nearest to the current one is searched. If found, RefIdxSymL0 is set equal to the reference index of the backward picture.

The forward reference picture in reference picture list 1 which is nearest to the current one is searched. If found, RefIdxSymL1 is set equal to the reference index of the forward picture.

If both backward and forward picture are found, BiDirPredFlag is set equal to 1. Otherwise, BiDirPredFlag is set equal to 0. Secondly, in CU level, a symmetrical mode flag indicating whether symmetrical mode is used or not is explicitly signaled if the prediction direction for the CU is bi-prediction and BiDirPredFlag is equal to 1.

When the flag is true, only mvp_l0_flag, mvp_l1_flag and MVD0 are explicitly signaled. The reference indices are set equal to RefdxSymL0, RefIdxSymL1 for list 0 and list 1, respectively. MVD1 is just set equal to −MVD0. The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

Figure 25:
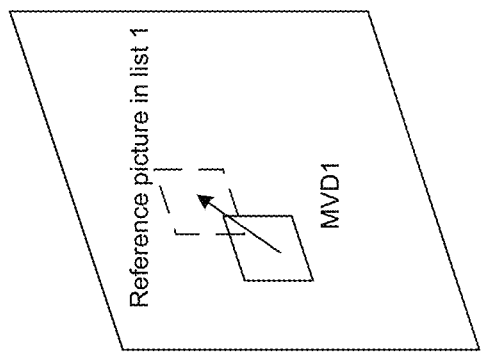
FIG. 25 shows an example of symmetrical mode of decoder side motion vector derivation.
Figure 25:
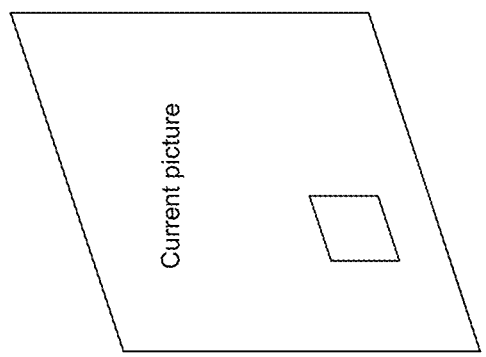
Figure 25:
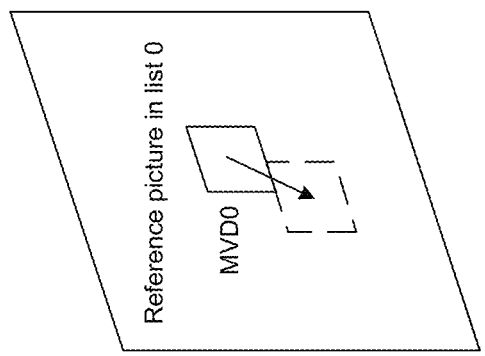

FIG. 25 shows an example illustration for symmetrical mode.

The modifications in coding unit syntax are shown in Table 4 (in bold face italics)

TABLE 4

| Modifications in coding unit syntax | |
|---|---|
| coding_unit( x0, y0, cbWidth, cbHeight, treeType ) { <br> . . . <br>  if( slice_type = = B ) <br>    inter_pred_idc[ x0 ][ y0 ] <br>  if( sps_affine enabled_flag && cbWidth >= 16 && cbHeight >= 16 ) { <br>    inter_affine_flag[ x0 ][ y0 ] <br>    if( sps_affine_type_flag && inter_affine_flag[ x0 ][ y0 ] ) <br>      cu_affine_type_flag[ x0 ][ y0 ] <br>  } <br>  if( inter_pred_idc[ x0 ][ y0 ] == PRED_BI && <br>    BiDirPredFlag && inter_affine_flag[ x0 ][ y0 ] == 0 ) <br>    symmetric_mvd_flag[ x0 ][ y0 ] <br>  if( inter pred idc[ x0 ][ y0 ] != PRED_L1 ) { <br>    if( num_ref_idx_l0_active_minus1 > 0 <br>&& !symmetric_mvd_flag[ x0 ][ y0 ] ) <br>      ref_idx_l0[ x0 ][ y0 ] <br>    mvd_coding( x0, y0, 0, 0 ) <br>    if( MotionModelIdc[ x0 ][ y0 ] > 0 ) <br>      mvd_coding( x0, y0, 0, 1 ) <br>    if(MotionModelIdc[ x0 ][ y0 ] > 1 ) <br>      mvd_coding( x0, y0, 0, 2 ) <br>    mvp_l0_flag[ x0 ][ y0 ] <br>  } else { <br>    MvdL0[ x0 ][ y0 ][ 0 ] = 0 <br>    MvdL0[ x0 ][ y0 ][ 1 ] = 0 <br>  } <br>  if( inter_pred_idc[ x0 ][ y0 ] != PRED_L0 ) { <br>    if( num_ref_idx_l1_active_minus1 > 0 <br>&& !symmetric_mvd_flag[ x0 ][ y0 ] ) <br>      ref_idx_l1[ x0 ][ y0 ] <br>    if( mvd_l1_zero flag && inter_pred_idc[ x0 ][ y0 ] = = PRED_BI ) { <br>      . . . <br>    } else { <br>    if( !symmetric_mvd_flag[ x0 ][ y0 ] ) { <br>      mvd_coding( x0, y0, 1, 0 ) <br>    if( MotionModelIdc[ x0 ][ y0 ] > 0 ) <br>      mvd coding( x0, y0, 1, 1 ) <br>    if(MotionModelIdc[ x0 ][ y0 ] > 1 ) <br>      mvd_coding( x0, y0, 1, 2 ) <br>    } <br>    mvp_l1_flag[ x0 ][ y0 ] <br>  } else { <br>    MvdL1[ x0 ][ y0 ][ 0 ] = 0 <br>    MvdL1[ x0 ][ y0 ][ 1 ] = 0 <br>  } <br>  . . . <br>  } <br>} <br>. . . <br>} | Descriptor <br><br><br>ae(v) <br><br><br>ae(v) <br><br><br>ae(v) <br><br><br><br>ae(v) <br><br><br>ae(v) <br><br><br><br><br><br><br>ae(v) <br><br><br><br><br><br>ae(v) <br><br><br><br><br><br><br><br><br><br><br>ae(v) |

3. Problems with Present Day Video Coding Technologies

The current decoder side motion vector derivation (DMVD) may have the following problems:
1. DMVR is enabled even when weighted prediction is enabled for current picture.
2. DMVD is disabled when the two reference pictures are with different POC distance from the current picture.
3. DMVR and BIO are enabled for different block sizes.
   a. DMVR is enabled when W*H>=64 && H>=8
   b. BIO is enabled when H>=8 && !(W==4 && H==8)
4. DMVR and BIO are performed at different sub-block level.
   a. DMVR may be performed at sub-block level. When both width and height of the CU are larger than 16, it is split into 16×16 sub-blocks. Otherwise, when width of the CU is larger than 16, it is split into 16×H sub-blocks in vertical direction, and when height of the CU is larger than 16, it is split into W×16 sub-blocks in horizontal directions.
   b. BIO is performed at block level.

4. Example Techniques and Embodiments

The detailed techniques below should be considered as examples to explain general concepts. These techniques should not be interpreted in a narrow way. Furthermore, these techniques can be combined in any manner.

In this document, DMVD includes methods like DMVR and FRUC which perform motion estimation to derive or refine the block/sub-block motion information, and BIO which performs sample-wise motion refinement.

The unequal weights applied to prediction blocks may refer to that used in the GBI process, LIC process, weighted prediction process or other encoding/decoding process of a coding tool that need to apply additional operations to prediction blocks instead of average of two prediction blocks etc. al.

Suppose the reference picture in list 0 and list 1 are Ref0 and Ref1 respectively, the POC distance between the current picture and Ref0 is PocDist0 (i.e., POC of current picture minus POC of Ref0), and the POC distance between Ref1 and the current picture is PocDist1 (i.e., POC of Ref1 minus POC of current picture). In this patent document, PocDist1 is the same as PocDis1 and PocDist0 is the same as PocDis0. Denote width and height of the block as W and H respectively. Suppose function abs(x) returns the absolute value of x.

1. The parameters applied to prediction blocks in the final prediction block generation process (e.g., weights information) may be utilized in the DMVD process.
   a. The parameters may be signaled to the decoder, such as with GBi or weighted prediction. GBi is also known as bi-prediction with coding unit (CU) weights (BCW).
   b. The parameters may be derived at the decoder, such as with LIC.
   c. The parameters may be for reshaping process that maps a set of sample values to another set of sample values.
   d. In one example, the parameters applied to prediction blocks may be applied in DMVD.
      i. In one example, when calculating the cost functions (e.g., SAD, MR-SAD, gradient), weighting factors according to the GBI index are firstly applied to the prediction blocks, and then cost is calculated.
      ii. In one example, when calculating the cost functions (e.g., SAD, MR-SAD, gradient), weighting factor and/or offsets according to the weighted prediction are firstly applied to the prediction blocks, and then cost is calculated.
      iii. In one example, when calculating the cost functions (e.g., SAD, MR-SAD, gradient), weighting factor and/or offsets according to the LIC parameters are firstly applied to the prediction blocks, and then cost is calculated.
      iv. In one example, when calculating the temporal gradients and spatial gradients in BIO, weighting factors according to the GBI index are firstly applied to the prediction blocks, and then these gradients are calculated.
      v. In one example, when calculating the temporal gradients and spatial gradients in BIO, weighting factor and/or offsets according to the weighted prediction are firstly applied to the prediction blocks, and then these gradients are calculated.
      vi. In one example, when calculating the temporal gradients and spatial gradients in BIO, weighting factor and/or offsets according to the LIC parameters are firstly applied to the prediction blocks, and then these gradients are calculated.
      vii. Alternatively, furthermore, the cost calculations (e.g., SAD, MR-SAD)/gradient calculations are performed in the reshaped domain.
      viii. Alternatively, furthermore, after motion information is refined, the reshaping process is disabled for prediction blocks generated with the refined motion information.
   e. In one example, DMVD may be disabled in GBI mode or/and LIC mode or/and weighted prediction or/and multi-hypothesis prediction.
   f. In one example, DMVD may be disabled in weighted prediction when weighting factors and/or offsets of the two reference pictures are different.
   g. In one example, DMVD may be disabled in LIC when weighting factors and/or offsets of the two reference blocks are different.

2. DMVD process (e.g., DMVR or BIO) may be applicable to bi-predicted blocks even when a first picture order count distance (PocDis0) is unequal to a second picture order count distance (PocDis1).
   a. In one example, all DMVD processes may be enabled or disabled according to the same rule on PocDis0 and PocDis1.
      i. For example, all DMVD processes may be enabled when PocDis0 is equal to PocDis1.
      ii. For example, all DMVD processes may be enabled when PocDis0 is unequal to PocDis1.
         1. Alternatively, furthermore, all DMVD processes may be disabled when PocDis0*PocDist1 is smaller than 0.
      iii. For example, all DMVD processes may be disabled when PocDis0 is unequal to PocDis1.
      iv. For example, all DMVD processes may be disabled when PocDis0*PocDist1 is smaller than 0.
   b. In one example, the current design for the case PocDis0 equal to PocDis1 is enabled.
      i. In one example, MVD of list 0 may be mirrored to list 1. That is, if (MvdX, MvdY) is used for list 0, then (−MvdX, −MvdY) is used for list 1 to identify two reference blocks.
      ii. Alternatively, MVD of list 1 may be mirrored to list 0. That is, if (MvdX, MvdY) is used for list 1, then (−MvdX, −MvdY) is used for list 0 to identify two reference blocks.
   c. Alternatively, instead of using mirrored MVD for list 0 and list 1 (that is, (MvdX, MvdY) is used for list 0, then (−MvdX, −MvdY) may be used for list 1), un-mirrored MVD may be used instead to identify two reference blocks.
      i. In one example, MVD of list 0 may be scaled to list 1 according to PocDist0 and PocDist1.
         1. Denote a selected MVD of list 0 by (MvdX, MvdY), then (−MvdX*PocDist1/PocDist0, −MvdY*PocDist1/PocDist0) is selected as the MVD applied to list 1.
      ii. In one example, MVD of list 1 may be scaled to list 0 according to PocDist0 and PocDist1.
         1. Denote a selected MVD of list 1 by (MvdX, MvdY), then (−MvdX*PocDist0/PocDist1, −MvdY*PocDist0/PocDist1) is selected as the MVD applied to list 0.
      iii. The division operation in the scaling can be implemented by a lookup table, multiple operations and right-right operations.
   d. How to define MVDs of two reference pictures (e.g., whether using mirror or with scaling of MVDs) may depend on the reference pictures.
      i. In one example, if abs(PocDist0) is smaller than or equal to abs(PocDist1), MVD of list 0 may be scaled to list 1 according to PocDist0 and PocDist1.
      ii. In one example, if abs(PocDist0) is greater than or equal to abs(PocDist1), MVD of list 0 may be scaled to list 1 according to PocDist0 and PocDist1.
      iii. In one example, if abs(PocDist1) is smaller than or equal to abs(PocDist0), MVD of list 1 may be scaled to list 0 according to PocDist0 and PocDist1.
      iv. In one example, if abs(PocDist1) is greater than or equal to abs(PocDist0), MVD of list 1 may be scaled to list 0 according to PocDist0 and PocDist1.

v. In one example, if one reference picture is a preceding picture and the other reference picture is a following picture of the current picture, MVD of list 0 may be mirrored to list 1 and MVD scaling is not performed.
e. Whether to and how to apply a kind of DMVD may depend on the sign of PocDist0 and the sign of PocDist1.
i. In one example, a kind of DMVD can only be done when PocDist0*PocDist1<0.
ii. In one example, a kind of DMVD can only be done when PocDist0*PocDist1>0.
f. Alternatively, DMVD process (e.g., DMVR or BIO) may be disabled when PocDist0 is not equal to PocDist1.
3. DMVR or/and other DMVD methods may be enabled in SMVD mode.
a. In one example, the decoded MVD/MV from the bitstream according to the SMVD mode may be further refined before being used to decode one block.
b. In one example, in SMVD mode, if the MV/MVD precision is N-pel, DMVR or/and other DMVD methods may be used to refine the MVD by mvdDmvr. mvdDmvr is with M-pel precision. N, M=1/16, 1/8, 1/4, 1/2, 1, 2, 4, 8, 16 etc.
i. In one example, M may be smaller than or equal to N.
c. In one example, MVD may be not signaled in SMVD mode, instead, DMVR or/and other DMVD methods may be applied to generate the MVD.
i. Alternatively, furthermore, AMVR information may be not signaled, and the MV/MVD precision may be derived to be with a predefined value (e.g., MVD is with ¼-pel precision).
1. In one example, indications of the predefined value may be signaled in sequence/picture/tile group/slice/tile/video data unit level.
2. In one example, the predefined value may be dependent on mode/motion information, such as affine or non-affine motion.
d. In one example, indication of whether DMVR or/and other DMVD methods are applied or not may be signaled for SMVD-coded blocks.
i. If DMVR or/and other DMVD methods are applied, MVD may be not signaled.
ii. In one example, such indication may be signaled for certain MV/MVD precisions. For example, such indication may be signaled for 1-pel or/and 4-pel MV/MVD precisions.
iii. In one example, such indication may be signaled only when PocDist0 is equal to PocDist1 and Ref0 is a preceding picture and Ref1 is a following picture of the current picture in display order.
iv. In one example, such indication may be signaled only when PocDist0 is equal to PocDist1 and Ref0 is a following picture and Ref1 is a preceding picture of the current picture in display order.
e. In one example, whether DMVR or/and other DMVD methods are applied for a SMVD-coded block may depend on the coding information of the current block and/or neighbouring blocks.
i. For example, whether DMVR or/and other DMVD methods are applied for a SMVD-coded block may depend on the block dimensions of the current.

ii. For example, whether DMVR or/and other DMVD methods are applied for a SMVD-coded block may depend on information of reference pictures, such as POCs.
iii. For example, whether DMVR or/and other DMVD methods are applied for a SMVD-coded block may depend on signaled MVD information.
4. DMVR or/and BIO or/and all DMVD methods may be enabled according to the same rule on block dimension.
a. In one example, DMVR and BIO or/and all DMVD methods and/or proposed methods may be enabled when W*H>=T1 && H>=T2. e.g. T1=64 and T2=8.
b. In one example, DMVR and BIO or/and all DMVD methods may be enabled H>=T1 && !(W==T2 && H==T1). E.g. T1=8 and T2=4.
c. In one example, when a block size contains less than M*H samples, e.g., 16 or 32 or 64 luma samples, DMVR and BIO or/and all DMVD methods are not allowed.
d. In one example, when a block size contains more than M*H samples, e.g., 16 or 32 or 64 luma samples, DMVR and BIO or/and all DMVD methods are not allowed.
e. Alternatively, when minimum size of a block's width or/and height is smaller than or no larger than X, DMVR and BIO or/and all DMVD methods are not allowed. In one example, X is set to 8.
f. Alternatively, when a block's width>th1 or >=th1 and/or a block's height>th2 or >=th2, DMVR and BIO or/and all DMVD methods are not allowed. In one example, th1 and/or th2 is set to 64.
i. For example, DMVR and BIO or/and all DMVD methods are disabled for M×M (e.g., 128×128) block.
ii. For example, DMVR and BIO or/and all DMVD methods are disabled for N×M/M×N block, e.g., wherein N>=64, M=128.
iii. For example, DMVR and BIO or/and all DMVD methods are disabled for N×M/M×N block, e.g., wherein N>=4, M=128.
g. Alternatively, when a block's width<th1 or <=th1 and/or a block's height<th2 or <=th2, DMVR and BIO or/and all DMVD methods are not allowed. In one example, th1 and/or th2 is set to 8.
5. DMVR and BIO or/and all DMVD methods may be performed at same sub-block level.
a. The motion vector refinement process, such as DMVR, may be performed in sub-block level.
i. The bilateral matching may be done in sub-block level instead of whole block level.
b. BIO may be performed in sub-block level.
i. In one example, the determination of enabling/disabling BIO may be done in sub-block level.
ii. In one example, sample-wise motion refinements in BIO may be done in sub-block level.
iii. In one example, determination of enabling/disabling BIO and sample-wise motion refinements in BIO may be done in sub-block level.
c. In one example, when a block with either width>=LW or height>=LH or width>=LW and height>=LH, the block may be split into multiple sub-blocks. Each sub-block is treated in the same way as a normal coding block with size equal to the sub-block size.
i. In one example, L is 64, a 64×128/128×64 block is split into two 64×64 sub-blocks, and a 128×128 block is split into four 64×64 sub-blocks. However, N×128/128×N block, wherein N<64, is not split into sub-blocks. The L value can refer to LH and/or LW.
    ii. In one example, L is 64, a 64×128/128×64 block is split into two 64×64 sub-blocks, and a 128×128 block is split into four 64×64 sub-blocks. Meanwhile, N×128/128×N block, wherein N<64, is split into two N×64/64×N sub-blocks. The L value can refer to LH and/or LW.
    iii. In one example, when width (or height) is larger than L, it is split vertically (or horizontally), and the width or/and height of the sub-block is no larger than L. The L value can refer to LH and/or LW.
  d. In one example, when size (i.e., width*height) of block is larger than a threshold L1, it may be split into multiple sub-blocks. Each sub-block is treated in the same way as a normal coding block with size equal to the sub-block size.
    i. In one example, the block is split into sub-blocks with same size that is no larger than L1.
    ii. In one example, if width (or height) of the block is no larger than a threshold L2, it is not split vertically (or horizontally).
    iii. In one example, L1 is 1024, and L2 is 32. For example, a 16×128 block is split into two 16×64 sub-blocks.
  e. The threshold L may be pre-defined or signaled in SPS/PPS/picture/slice/tile group/tile level.
  f. Alternatively, the thresholds may depend on certain coded information, such as block size, picture type, temporal layer index, etc. al.
6. The decision of whether and how to apply a kind of DMVD may be made once and shared by all color components, or it may be made multiple times for different color components.
  a. In one example, the decision for DMVD is made based on the information of the Y (or G) component and is followed by other color components.
  b. In one example, the decision for DMVD applied on Y (or G) component is made based on the information of the Y (or G) component. And the decision for DMVD applied on Cb (or Cb, or B, or R) component is made based on the information of the Cb (or Cb, or B, or R) component.

Figure 23:
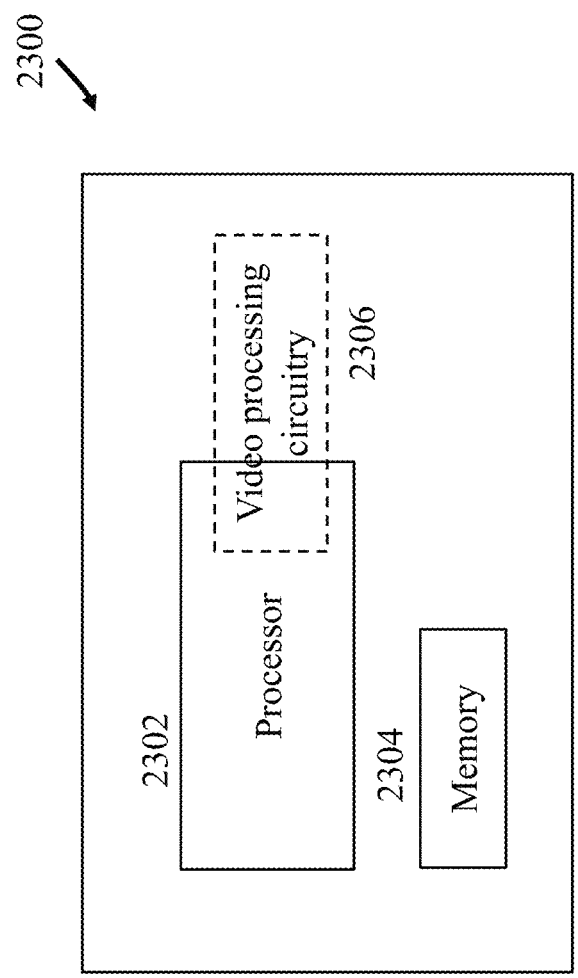
FIG. 23 shows an example of a hardware platform for implementing a technique described in the present document.

FIG. 23 is a block diagram of a video processing apparatus 2300. The apparatus 2300 may be used to implement one or more of the methods described herein. The apparatus 2300 may be embodied in a smartphone, tablet, computer, Internet of Things (IoT) receiver, and so on. The apparatus 2300 may include one or more processors 2302, one or more memories 2304 and video processing hardware 2306. The processor(s) 2302 may be configured to implement one or more methods described in the present document. The memory (memories) 2304 may be used for storing data and code used for implementing the methods and techniques described herein. The video processing hardware 2306 may be used to implement, in hardware circuitry, some techniques described in the present document, and may be partly or completely be a part of the processors 2302 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that several techniques have been disclosed that will benefit video encoder and decoder embodiments incorporated within video processing devices such as smartphones, laptops, desktops, and similar devices by allowing the use of the techniques disclosed in the present document.

Figure 24A:
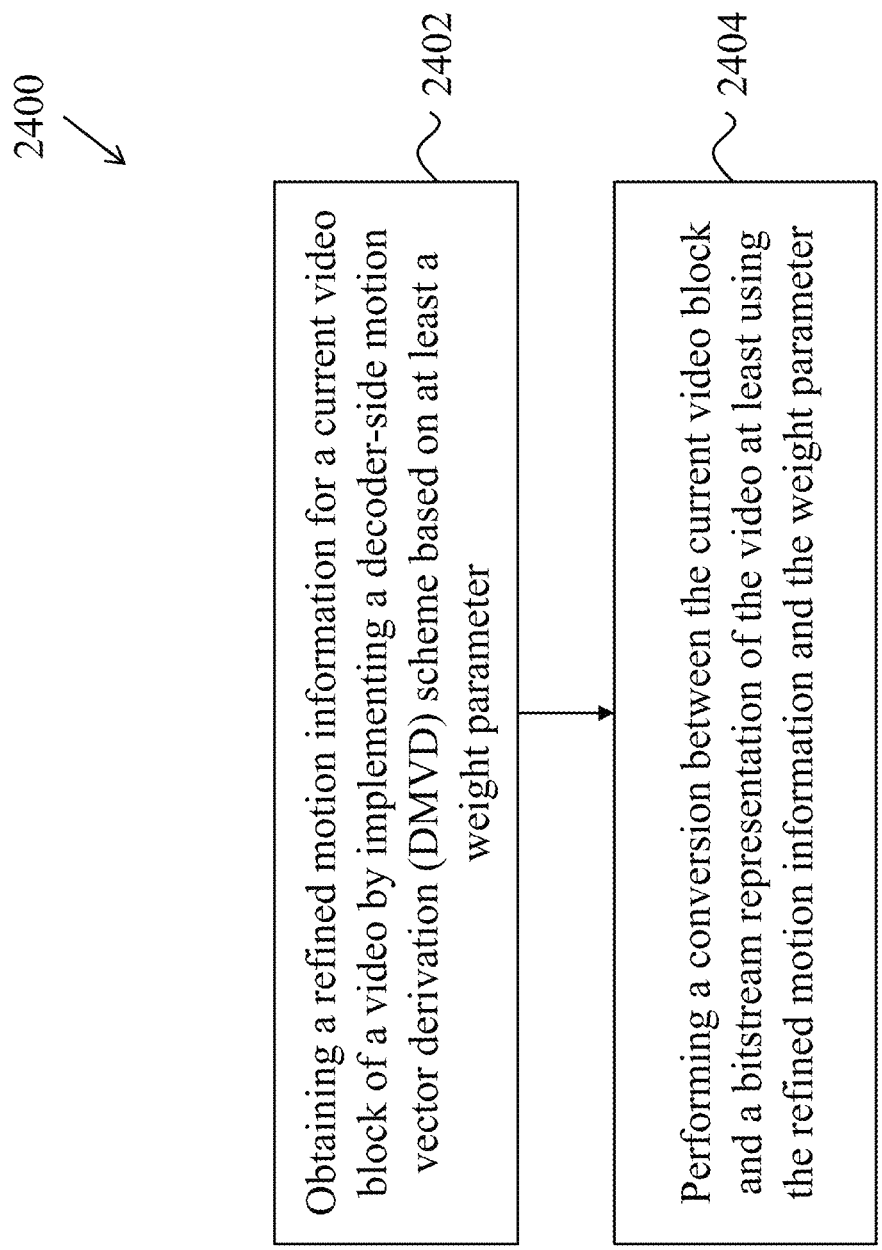

FIG. 24A is a flowchart for an example method 2400 of video processing. The method 2400 includes, at 2402, obtaining a refined motion information for a current video block of a video by implementing a decoder-side motion vector derivation (DMVD) scheme based on at least a weight parameter, where the weight parameter is applied to prediction blocks in a generation process for a final prediction block for the current video block. The method 2400 includes, at 2404 performing a conversion between the current video block and a bitstream representation of the video at least using the refined motion information and the weight parameter.

In some embodiments for method 2400, a field in the bitstream representation is indicative of the weight parameter. In some embodiments for method 2400, an indication of the weight parameter is signaled using a Bi-prediction with Coding unit Weights (BCW) technique. In some embodiments for method 2400, an indication of the weight parameter is signaled using a weighted prediction technique. In some embodiments for method 2400, the weight parameter is derived. In some embodiments for method 2400, the weight parameter is derived using a Local Illumination Compensation (LIC) technique. In some embodiments for method 2400, the weight parameter is associated with a reshaping process that maps a set of sample values to another set of sample values. In some embodiments for method 2400, the DMVD scheme is implemented by applying the weight parameter to prediction blocks of the current video block. In some embodiments for method 2400, the conversion includes calculating a predictive cost function for the current video block by first applying the weight parameter according to a Bi-prediction with Coding unit Weights (BCW) index to the prediction blocks and then calculating the predictive cost function.

In some embodiments for method 2400, the conversion includes calculating a predictive cost function for the current video block by first applying the weight parameter according to a weighted prediction scheme to the prediction blocks and then calculating the predictive cost function. In some embodiments for method 2400, the conversion includes calculating a predictive cost function for the current video block by first applying the weight parameter according to a Local Illumination Compensation (LIC) scheme to the prediction blocks and then calculating the predictive cost function. In some embodiments for method 2400, the predictive cost function is a gradient function. In some embodiments for method 2400, the predictive cost function is a sum of absolute difference (SAD) cost function. In some embodiments for method 2400, the predictive cost function is a mean-removed sum of absolute difference (MR-SAD) cost function.

In some embodiments for method 2400, the conversion includes calculating, for the current video block, temporal gradients and spatial gradients of a Bi-directional Optical flow (BIO) scheme by first applying the weight parameter according to a Bi-prediction with Coding unit Weights (BCW) index to the prediction blocks and then calculating the temporal gradients and the spatial gradients. In some embodiments for method 2400, the conversion includes calculating, for the current video block, temporal gradients and spatial gradients of a Bi-directional Optical flow (BIO) scheme by first applying the weight parameter according to a weighted prediction scheme to the prediction blocks and then calculating the temporal gradients and the spatial gradients.

In some embodiments for method 2400, the conversion includes calculating, for the current video block, temporal gradients and spatial gradients of a Bi-directional Optical flow (BIO) scheme by first applying the weight parameter according to a Local Illumination Compensation (LIC) scheme to the prediction blocks and then calculating the temporal gradients and the spatial gradients. In some embodiments for method 2400, the calculating of the predictive cost function or the temporal gradients or the spatial gradients is performed in a reshaped domain. In some embodiments for method 2400, a reshaping process is disabled for prediction blocks generated with the refined motion information for the current video block.

Figure 24B:
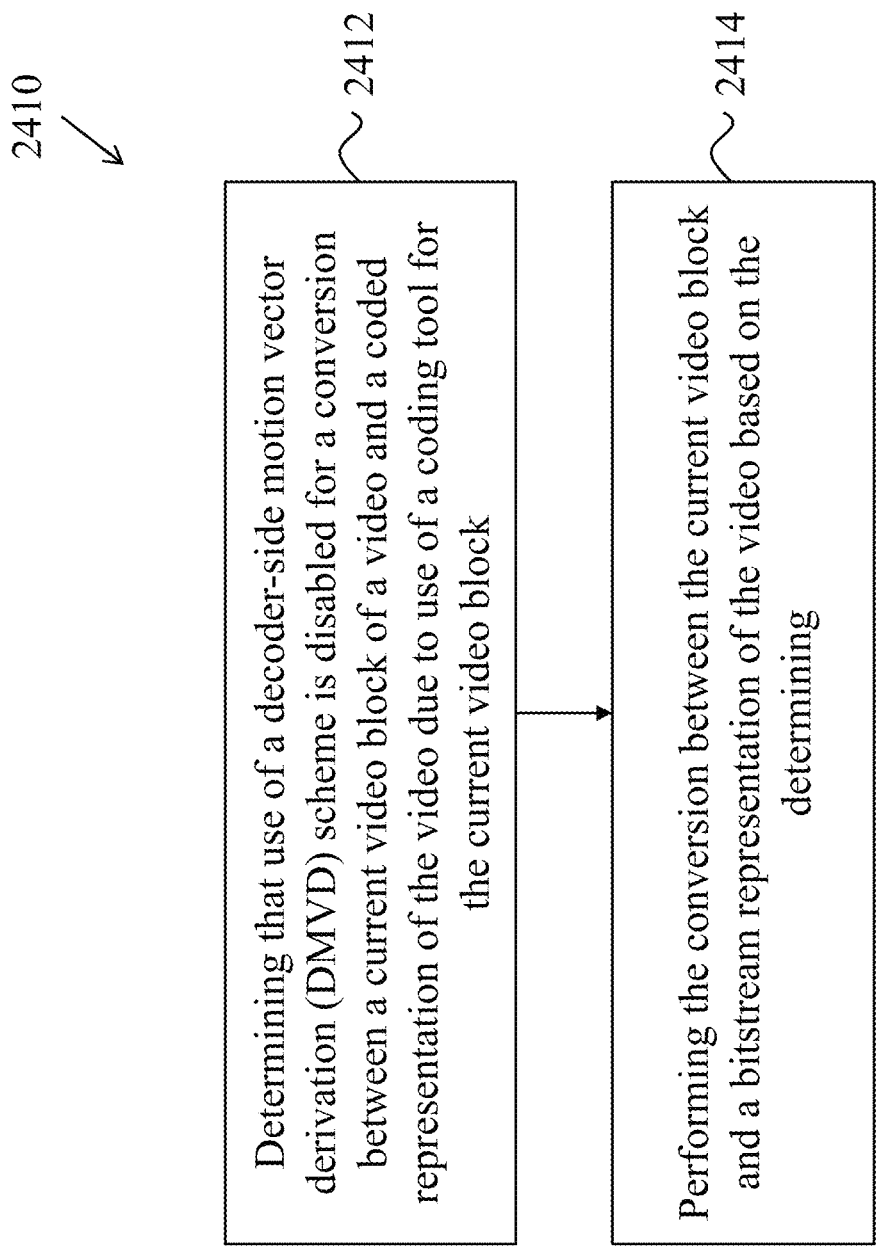

FIG. 24B is a flowchart for an example method 2410 of video processing. The method 2410 includes, at 2412, determining that use of a decoder-side motion vector derivation (DMVD) scheme is disabled for a conversion between a current video block of a video and a coded representation of the video due to use of a coding tool for the current video block. The method 2410 includes, at 2414, performing the conversion between the current video block and a bitstream representation of the video based on the determining, where the coding tool includes applying unequal weighting factors to prediction blocks of the current video block. In some embodiments for method 2410, the coding tool is configured to use a weight factor in a sample prediction process.

In some embodiments for method 2410, the coding tool includes a Bi-prediction with Coding unit Weights (BCW) mode. In some embodiments for method 2410, two weighting factors used for two prediction blocks in the BCW mode are unequal. In some embodiments for method 2410, the weighting factor is indicated in a field in the bitstream representation with the current video block. In some embodiments, the DMVD scheme includes a decoder-side motion vector refinement (DMVR) coding mode which derives a refined motion information based on the predictive cost function. In some embodiments, the DMVD scheme includes a Bi-directional optical flow (BDOF) coding mode coding tool which derives a refined prediction based on the gradient calculation. In some embodiments for method 2410, the BCW mode being used by the current video block comprises using the field that represents a BCW index and an index of the weighting factor, and the BCW index is unequal to 0.

In some embodiments for method 2410, the coding tool includes a weighted prediction mode. In some embodiments for method 2410, the weighted prediction mode being used by the current video block comprises applying weighted prediction to at least one of prediction block of the current video block. In some embodiments for method 2410, the coding tool includes a Local Illumination Compensation (LIC) mode. In some embodiments for method 2410, the coding tool includes a multi-hypothesis prediction mode. In some embodiments for method 2410, a first weight parameter for a first reference picture and a second weight parameter for a second reference picture are associated with the weighted prediction mode for the current video block, and the DMVD scheme is determined to be disabled for the current video block in response to the first weight parameter being different from the second weight parameter.

In some embodiments for method 2410, the first weight parameter and/or the second weight parameter are indicated in a field in the bitstream representation with a video unit including the current video block, the video unit comprises at least one of picture or a slice. In some embodiments for method 2410, a first linear model parameter for a first reference picture of the current video block and a second linear model parameter for a second reference picture of the current video block, and the DMVD scheme is determined to be disabled for the current video block in response to the first linear model parameter being different from the second linear model parameter.

Figure 24C:
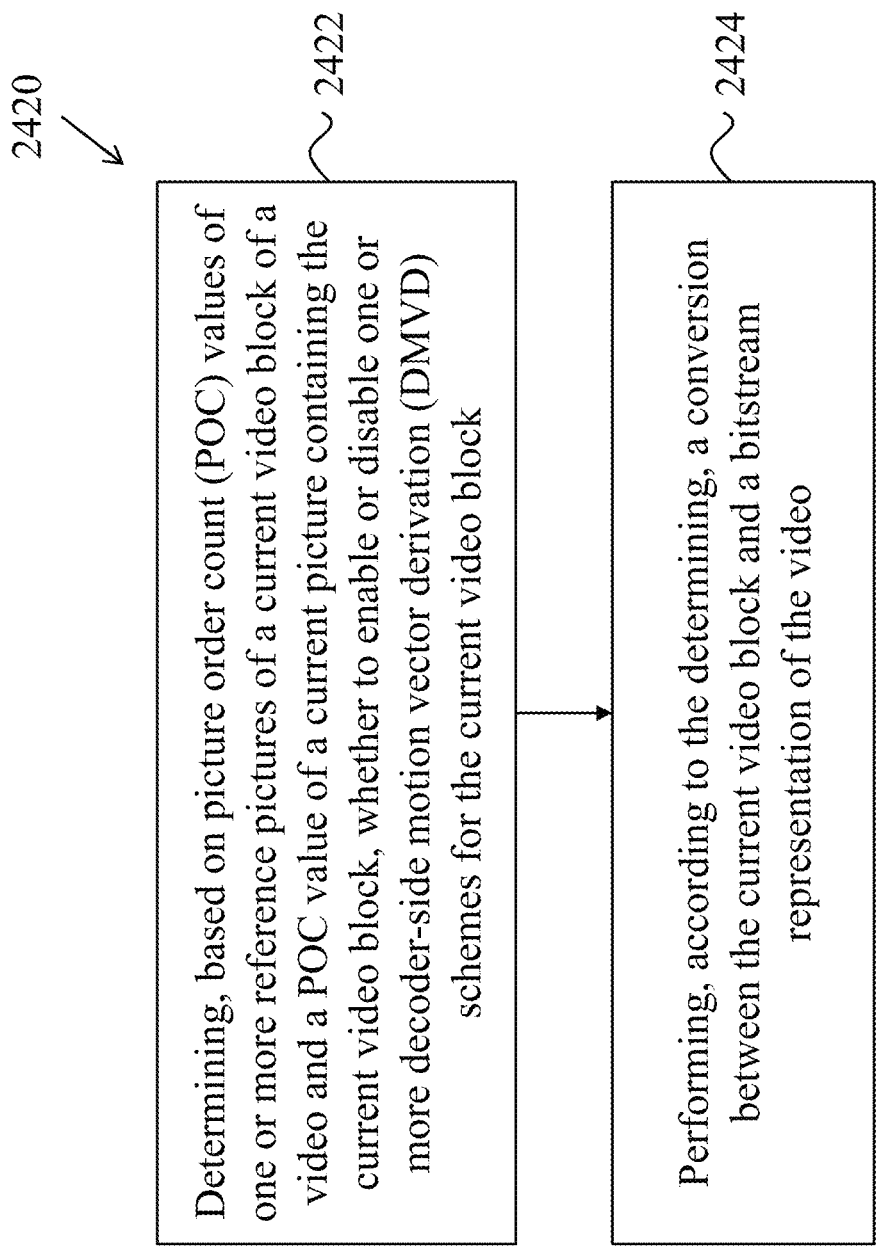

FIG. 24C is a flowchart for an example method 2420 of video processing. The method 2420 includes, at 2422, determining, based on picture order count (POC) values of one or more reference pictures of a current video block of a video and a POC value of a current picture containing the current video block, whether to enable or disable one or more decoder-side motion vector derivation (DMVD) schemes for the current video block. The method 2420 includes, at 2424, performing, according to the determining, a conversion between the current video block and a bitstream representation of the video.

In some embodiments for method 2420, the determining whether to enable or disable the one or more DMVD schemes is based on a relationship between a first POC distance (PocDis0) representing a first distance from a first reference picture of the current video block to the current picture and a second POC distance (PocDis1) representing a second distance from the current picture to a second reference picture of the current video block. In some embodiments for method 2420, the first reference picture is a reference picture list 0 of the current video block and the second reference picture is a reference picture list 1 of the current video block, In some embodiments for method 2420, the PocDist0 is set to a first POC value of the current picture minus a second POC value of the first reference picture, and the PocDist1 is set to a third POC value of the second reference picture minus the first POC value of the current picture. In some embodiments for method 2420, the one or more DMVD schemes are enabled in response to the PocDis0 being unequal to the PocDis1. In some embodiments for method 2420, the determining of whether to enable or disable more than one DMVD schemes among the one or more DMVD schemes is based on a same rule being applied with respect to the PocDis0 and the PocDis1. In some embodiments for method 2420, the one or more DMVD schemes are enabled in response to the PocDis0 being equal to the PocDis1.

In some embodiments for method 2420, the one or more DMVD schemes are disabled in response to the PocDis0 multiplied by the PocDis1 being less than zero. In some embodiments for method 2420, the one or more DMVD schemes are disabled in response to the PocDis0 being unequal to the PocDis1. In some embodiments for method 2420, the one or more DMVD schemes identify, during the conversion, two reference blocks using a first set of motion vector difference (MVD) for a first reference picture list and a second set of MVD for a second reference picture list, the first set of MVD is a mirrored version of the second set of MVD. In some embodiments for method 2420, the one or more DMVD schemes identify, during the conversion, two reference blocks using a first set of motion vector difference (MVD) for a first reference picture list and a second set of MVD for a second reference picture list, the second set of MVD is a mirrored version of the first set of MVD.

In some embodiments for method 2420, the one or more DMVD schemes identify, during the conversion, two reference blocks using a first set of motion vector difference (MVD) for a first reference picture list and a second set of MVD for a second reference picture list, the first set of MVD is an un-mirrored version of the second set of MVD. In some embodiments for method 2420, the first set of MVD is scaled to the second set of MVD according to the PocDis0 and the PocDis1. In some embodiments for method 2420, the first set of MVD including (MvdX, MvdY) is scaled to the second set of MVD that is calculated as follows: (−MvdX*PocDis1/PocDis0, −MvdY*PocDis1/PocDis0). In some embodiments for method 2420, the second set of MVD is scaled to the first set of MVD according to the PocDis0 and the PocDis1. In some embodiments for method 2420, the second set of MVD including (MvdX, MvdY) is scaled to the first set of MVD that is calculated as follows: (−MvdX*PocDis0/PocDis1, −MvdY*PocDis0/PocDis1).

In some embodiments for method 2420, a division operation for the scaled operation is implemented using a lookup table, multiple operations, or right-right operations. In some embodiments for method 2420, the one or more DMVD schemes determine, during a DMVD process, a first set of motion vector difference (MVD) for a first reference picture list and a second set of MVD for a second reference picture list for a current video block of a video, based on the POC values of reference pictures of the current video block and the POC value of a current picture containing the current video block. In some embodiments for method 2420, in response to a first absolute value of the PocDis0 being less than or equal to a second absolute value of the PocDis1, the first set of MVD is scaled to generate the second set of MVD according to the PocDis0 and the PocDis1. In some embodiments for method 2420, in response to a first absolute value of the PocDis0 being greater than or equal to a second absolute value of the PocDis1, the first set of MVD is scaled to generate the second set of MVD according to the PocDis0 and the PocDis1.

In some embodiments for method 2420, in response to a second absolute value of the PocDis1 being less than or equal to a first absolute value of the PocDis0, the second set of MVD is scaled to generate the first set of MVD according to the PocDis0 and the PocDis1. In some embodiments for method 2420, in response to a second absolute value of the PocDis1 being greater than or equal to a first absolute value of the PocDis0, the second set of MVD is scaled to generate the first set of MVD according to the PocDis0 and the PocDis1. In some embodiments for method 2420, in response to the two reference pictures including a first reference picture that precedes the current picture and a second reference picture that follows the current picture, the first set of MVD is mirrored to generate the second set of MVD and scaling is not performed for obtaining the first set of MVD or the second set of MVD. In some embodiments for method 2420, the determining whether to enable or disable the one or more DMVD schemes is based on a first sign of a first picture order count distance (PocDis0) representing a first distance from a first reference picture of the current video block to the current picture and a second sign of a second picture order count distance (PocDis1) representing a second distance from the current picture to a second reference picture of the current video block.

In some embodiments for method 2420, the one or more DMVD schemes is enabled in response to a result of the PocDis0 having the first sign multiplied by the PocDis1 having the second sign being less than zero. In some embodiments for method 2420, the one or more DMVD schemes is enabled in response to a result of the PocDis0 having the first sign multiplied by the PocDis1 having the second sign being greater than zero. In some embodiments for method 2420, the one or more DMVD schemes is disabled in response to a first picture order count distance (PocDis0) representing a first distance from a first reference picture of the current video block to the current picture being unequal to a second picture order count distance (PocDis1) representing a second distance from the current picture to a second reference picture of the current video block.

In some embodiments for method 2420, a motion information of the first reference picture list is refined using the first set of MVD and a motion information of the second reference picture list is refined using the second set of MVD. In some embodiments for method 2420, the first reference picture list is a reference picture list 0 and the second reference picture list is a reference picture list 1.

Figure 24D:
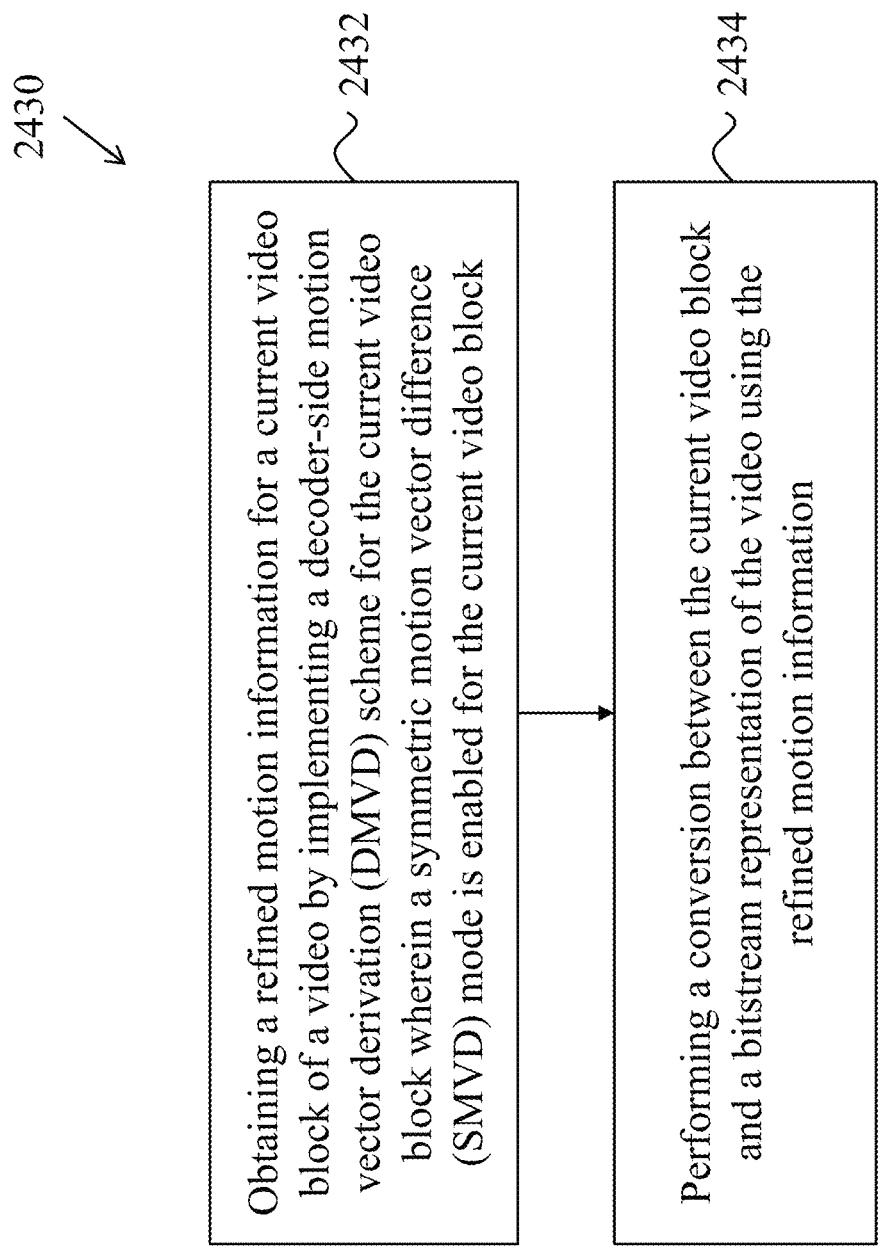

FIG. 24D is a flowchart for an example method 2430 of video processing. The method 2430 includes, at 2432, obtaining a refined motion information for a current video block of a video by implementing a decoder-side motion vector derivation (DMVD) scheme for the current video block where a symmetric motion vector difference (SMVD) mode is enabled for the current video block. The method 2430 includes, at 2434, performing a conversion between the current video block and a bitstream representation of the video using the refined motion information.

In some embodiments for method 2430, the bitstream representation includes a motion vector difference (MVD) for the refined motion information, and the MVD is decoded according to the SMVD mode and is further refined before being used to decode the current video block. In some embodiments for method 2430, where, in the SMVD mode, the DMVD scheme is used to refine a motion vector difference (MVD) for the refined motion information by changing a motion vector (MV) precision or a MVD precision from N-pel precision to an M-pel precision, N and M are equal to $\frac{1}{16}$, $\frac{1}{8}$, $\frac{1}{4}$, $\frac{1}{2}$, 1, 2, 4, 8, or 16. In some embodiments for method 2430, the M is less than or equal to the N. In some embodiments for method 2430, the bitstream representation does not include a signaling for a motion vector difference (MVD) for the refined motion information in the SMVD mode, and the MVD is generated using the DMVD scheme.

In some embodiments for method 2430, an Adaptive Motion Vector difference Resolution (AMVR) information is not signaled in the bitstream representation for a video block coded in SMVD mode, and a motion vector (MV) precision or a motion vector difference (MVD) precision for the refined motion information is derived according to a pre-defined value. In some embodiments for method 2430, the MV precision or the MVD precision is $\frac{1}{4}$-pel precision. In some embodiments for method 2430, the pre-defined value is signaled in a sequence, a picture, a tile group, a slice, a tile, a video data unit level in the bitstream representation. In some embodiments for method 2430, the pre-defined value depends on a mode information or a motion information. In some embodiments for method 2430, the mode information or the motion information includes an affine motion information or a non-affine motion information.

Figure 24E:
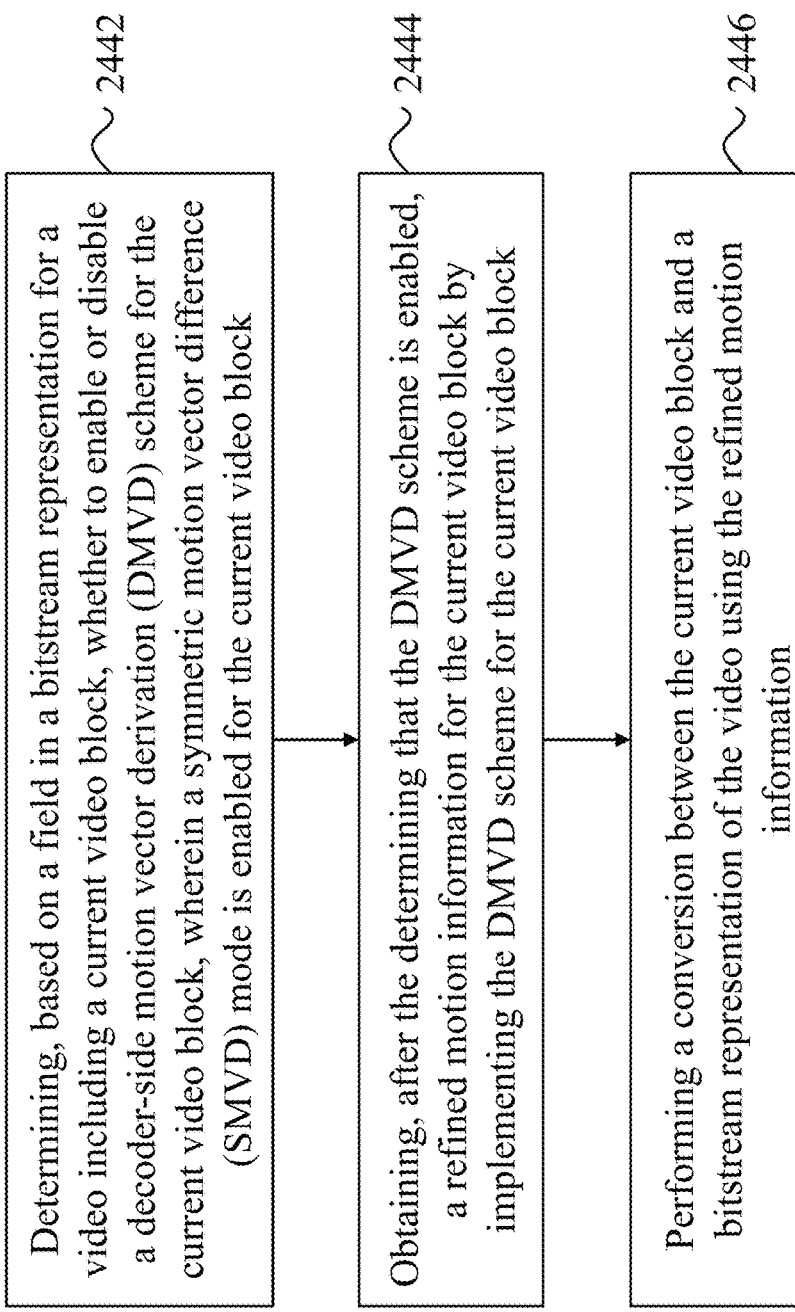

FIG. 24E is a flowchart for an example method 2440 of video processing. The method 2440 includes, at 2442, determining, based on a field in a bitstream representation for a video including a current video block, whether to enable or disable a decoder-side motion vector derivation (DMVD) scheme for the current video block, a symmetric motion vector difference (SMVD) mode is enabled for the current video block. The method 2440 includes, at 2444, obtaining, after the determining that the DMVD scheme is enabled, a refined motion information for the current video block by implementing the DMVD scheme for the current video block. The method 2440 includes, at 2446, performing a conversion between the current video block and a bitstream representation of the video using the refined motion information.

In some embodiments for method 2440, a motion vector difference (MVD) is not signaled in the bitstream representation in response to the DMVD scheme being enabled. In some embodiments for method 2440, the field indicating whether the DMVD scheme is enabled or disabled is present in the bitstream representation for one or more motion vector (MV) precisions or motion vector difference (MVD) precisions. In some embodiments for method 2440, the one or more MV precisions or MVD precisions include 1-pel and/or 4-pel precision.

In some embodiments for method 2440, the field indicating whether the DMVD scheme is enabled or disabled is present in the bitstream presentation in response to a first picture order count distance (PocDis0) representing a first distance from a first reference picture (Ref0) of the current video block to the current picture being equal to a second picture order count distance (PocDis1) representing a second distance from the current picture to a second reference picture (Ref1) of the current video block, and the first reference picture (Ref0) precedes the current picture and the second reference picture (Ref1) follows the current picture in a display order.

In some embodiments for method 2440, the field indicating whether the DMVD scheme is enabled or disabled is present in the bitstream presentation in response to a first picture order count distance (PocDis0) representing a first distance from a first reference picture (Ref0) of the current video block to the current picture being equal to a second picture order count distance (PocDis1) representing a second distance from the current picture to a second reference picture (Ref1) of the current video block, and the second reference picture (Ref1) precedes the current picture and the first reference picture (Ref0) follows the current picture in a display order.

In some embodiments for method 2440, the DMVD scheme is enabled in SMVD mode based on a coding information of the current video block and/or of one or more neighboring blocks. In some embodiments for method 2440, the DMVD scheme is enabled in SMVD mode based on a block dimensions of the current video block. In some embodiments for method 2440, the DMVD scheme is enabled in SMVD mode based on information related to reference pictures for the current video block. In some embodiments for method 2440, information related to the reference pictures includes picture order count (POC) information. In some embodiments for method 2440, the DMVD scheme is enabled in SMVD mode based on a signaling for a motion vector difference (MVD) information in the bitstream representation. In some embodiments for method 2420, the one or more DMVD schemes include a decoder-side motion vector refinement (DMVR) scheme. In some embodiments for methods 2430 and 2440, the DMVD scheme include a decoder-side motion vector refinement (DMVR) scheme. In some embodiments for method 2430, the one or more DMVD schemes include a bi-directional optical flow (BDOF) scheme. In some embodiments for methods 2430 and 2440, the DMVD scheme include a bi-directional optical flow (BDOF) scheme.

Figure 24F:
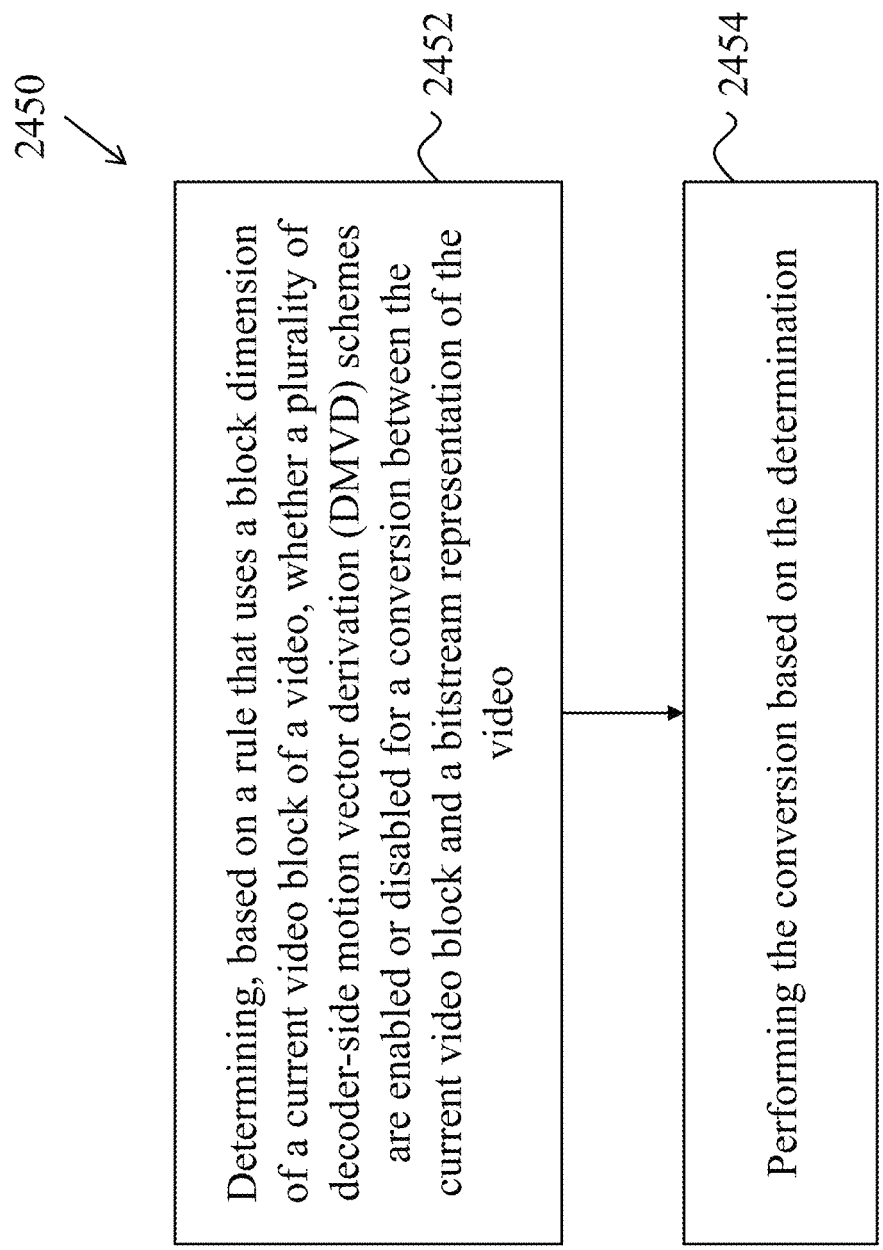

FIG. 24F is a flowchart for an example method 2450 of video processing. The method 2450 includes, at 2452, determining, based on a rule that uses a block dimension of a current video block of a video, whether a plurality of decoder-side motion vector derivation (DMVD) schemes are enabled or disabled for a conversion between the current video block and a bitstream representation of the video. The method 2450 includes, at 2454, performing the conversion based on the determination.

In some embodiments for method 2450, the plurality of DMVD schemes are determined to be enabled in response to (W*H)>=T1 and H>=T2, where W and H are respectively width and height of the current video block and T1 and T2 are rational numbers. In some embodiments for method 2450, T1 is 64 and T2 is 8. In some embodiments for method 2450, the plurality of DMVD schemes are determined to be enabled in response to H>=T1 and either W is not equal to T2 or H is not equal to T1, where W and H are respectively width and height of the current video block and T1 and T2 are rational numbers. In some embodiments for method 2450, T1 is 8 and T2 is 4.

In some embodiments for method 2450, the plurality of DMVD schemes are determined to be disabled in response to a first number of samples of the current video block being less than a second number of samples. In some embodiments for method 2450, the plurality of DMVD schemes are determined to be disabled in response to a first number of samples of the current video block being greater than a second number of samples. In some embodiments for method 2450, the second number of samples is 16 luma samples or 32 luma samples or 64 luma samples or 128 luma samples. In some embodiments for method 2450, the plurality of DMVD schemes are determined to be disabled in response to a width of the current video block being less than a value.

In some embodiments for method 2450, the plurality of DMVD schemes are determined to be disabled in response to a height of the current video block being less than a value. In some embodiments for method 2450, the value is 8. In some embodiments for method 2450, the plurality of DMVD schemes are determined to be disabled in response to a width of the current video block being greater than or equal to a first threshold and/or in response to a height of the current video block being greater than or equal to a second threshold. In some embodiments for method 2450, the width is 128 and the height is 128. In some embodiments for method 2450, the width is greater than or equal to 64 and the height is 128, or the width is 128 and the height is greater than or equal to 64. In some embodiments for method 2450, the width is greater than or equal to 4 and the height is 128, or the width is 128 and the height is greater than or equal to is 4. In some embodiments for method 2450, the first threshold and the second threshold is 64.

In some embodiments for method 2450, the plurality of DMVD schemes are determined to be disabled in response to a width of the current video block being less than or equal to a first threshold and/or in response to a height of the current video block being less than or equal to a second threshold. In some embodiments for method 2450, the first threshold and the second threshold are 8. In some embodiments, the plurality of DMVD schemes include a decoder-side motion vector refinement (DMVR) scheme which derives a refined motion information based on a cost function. In some embodiments, the plurality of DMVD schemes include a bi-directional optical flow (BDOF) scheme which derives a refined motion information based on a gradient calculation.

Figure 24G:
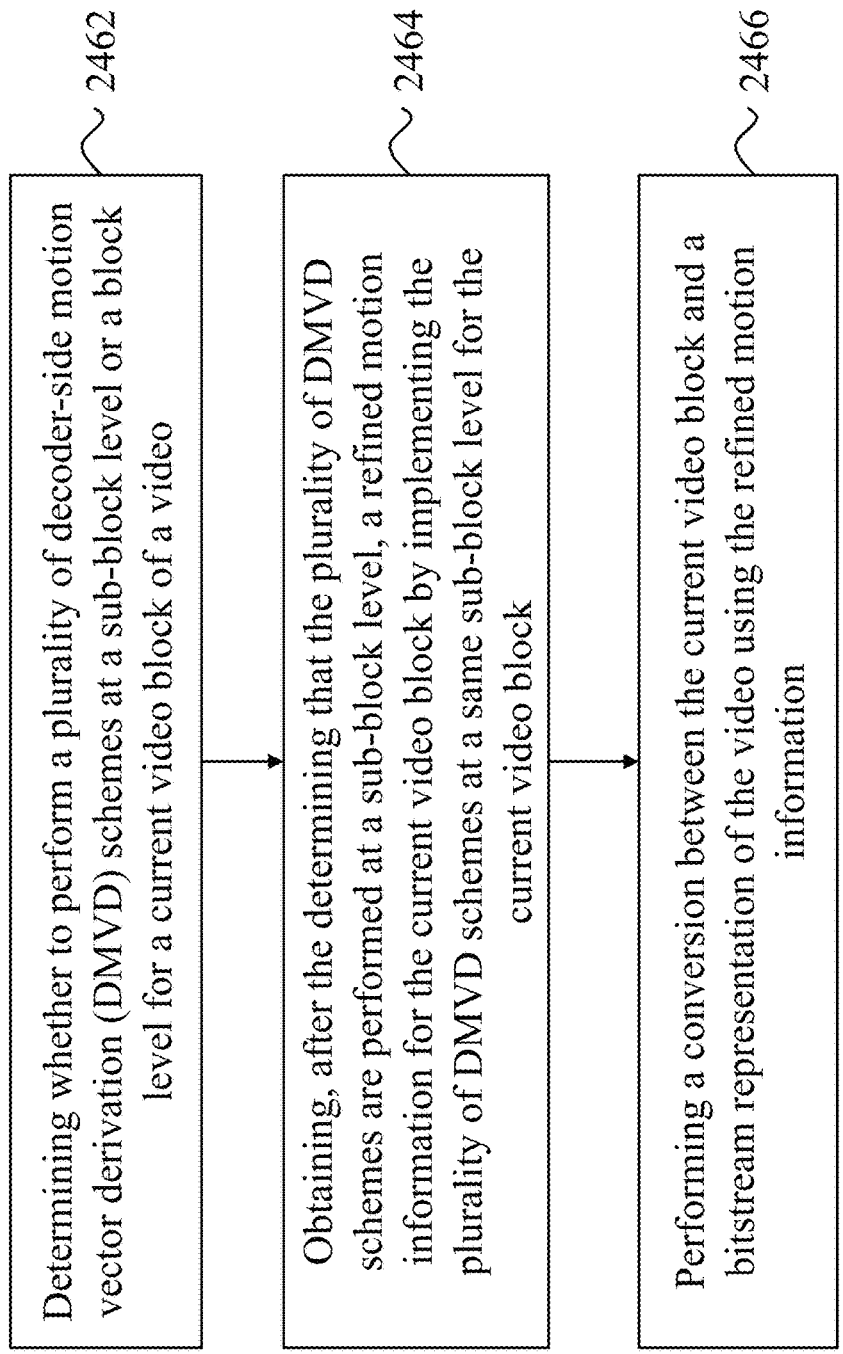

FIG. 24G is a flowchart for an example method 2460 of video processing. The method 2460 includes, at 2462, determining whether to perform a plurality of decoder-side motion vector derivation (DMVD) schemes at a sub-block level or a block level for a current video block of a video. The method 2460 includes, at 2464, obtaining, after the determining that the plurality of DMVD schemes are performed at a sub-block level, a refined motion information for the current video block by implementing the plurality of DMVD schemes at a same sub-block level for the current video block. The method 2460 includes, at 2466, performing a conversion between the current video block and a bitstream representation of the video using the refined motion information.

In some embodiments for method 2460, the plurality of DMVD scheme includes decoder-side motion vector refinement (DMVR) schemes. In some embodiments for method 2460, the refined motion information is obtained by applying a bilateral matching in the DMVR scheme at the sub-block level for the current video block. In some embodiments for method 2460, the plurality of DMVD schemes includes bi-directional optical flow (BDOF) coding schemes. In some embodiments for method 2460, the BDOF coding scheme is determined to be enabled or disabled at the sub-block level for the current video block. In some embodiments for method 2460, the BDOF coding scheme is determined to be enabled and the refined motion information is obtained by performing a sample-wise refinement of the motion information performed at the sub-block level of the current video block in the BDOF coding scheme.

In some embodiments for method 2460, the BDOF coding scheme is determined to be enabled or disabled at the sub-block level of the current video block, and a sample-wise motion information refinement process in the BDOF coding scheme is determined to be performed at the sub-block level of the current video block. In some embodiments for method 2460, a width and a height of the sub-block are both equal to 16. In some embodiments for method 2460, the current video block is split into multiple sub-blocks in response to: a first width of the current video block being greater than or equal to a value, or a first height of the current video block being greater than or equal to the value, or the first width being greater than or equal to the value and the first height being greater than or equal to the value.

In some embodiments for method 2460, each of the multiple sub-blocks is processed by one or more DMVD schemes in a same way as a coding block with size equal to a sub-block size. In some embodiments for method 2460, the value is 64, and in response to the current video block either having the first width of 64 and the first height of 128 or having the first width of 128 and the first height of 64, the current video block is split into two sub-blocks where each of the two sub-blocks has a second width and a second height of 64. In some embodiments for method 2460, the value is 64, and in response to the current video block having the first width of 128 and the first height of 128, the current video block is split into four sub-blocks where each of the two sub-blocks has a second width and a second height of 64.

In some embodiments for method 2460, the current video block is not split into sub-blocks in response to the current video block either having the first width of N and the first height of 128 or having the first width of 128 and the first height of N, where N is less than 64. In some embodiments for method 2460, the value is 64, and in response to the current video block either having the first width of N and the first height of 128 or having the first width of 128 and the first height of N where N is less than 64, the current video block is split into two sub-blocks where each of the two sub-blocks either has a second width of N and a second height of 64 or has the second width of 64 and the second height of N.

In some embodiments for method 2460, the current video block is split vertically in response to a first width of the current video block is greater than a value, and a second width of a sub-block of the current video block is less than or equal to the value. In some embodiments for method 2460, the current video block is split horizontally in response to a first height of the current video block is greater than a value, and a second height of a sub-block of the current video block is less than or equal to the value. In some embodiments for method 2460, the value is 16. In some embodiments for method 2460, the second width of a sub-block of the current video block is 16. In some embodiments for method 2460, the second height of a sub-block of the current video block is 16. In some embodiments for method 2460, the current video block is split into multiple sub-blocks in response to a first size of the current video block being greater than a first threshold value. In some embodiments for method 2460, each of the multiple sub-blocks is processed by one or more DMVD schemes in a same way as a coding block with a second size equal to a sub-block size.

In some embodiments for method 2460, each of the multiple sub-blocks has a same size that is less than or equal to the first threshold value. In some embodiments for methods 2450 and 2460, the current video block is a luma video block. In some embodiments for method 2450, the determining whether to enable or disable the plurality of DMVD schemes is performed on the luma video block and shared by the associated chroma video blocks. In some embodiments for method 2460, the determining whether to perform the plurality of DMVD schemes at a sub-block level is performed on the luma video block and shared by the associated chroma video blocks. In some embodiments for method 2460, the current video block is determined not to be split horizontally or vertically into multiple sub-blocks in response to a height or a width of the current video block being less than or equal to a second threshold value. In some embodiments for method 2460, the first threshold value is 1024 and the second threshold value is 32.

In some embodiments for method 2460, the value is pre-defined or signaled in a sequence parameter set (SPS), a picture parameter set (PPS), a picture, a slice, a tile group, or tile level for the current video block. In some embodiments for method 2460, the value or the first threshold value or the second threshold value depends on coded information of the current video block. In some embodiments for method 2460, a determination of the sub-block size is same for the plurality of DMVD schemes. In some embodiments for method 2460, the coded information of the current video block includes a block size or a picture type or a temporal layer index of the current video block. In some embodiments for methods 2450 and 2460, the plurality of DMVD for the current video block include all DMVD schemes for the current video block.

FIG. 24H is a flowchart for an example method 2470 of video processing. The method 2470 includes, at 2472, determining whether to enable or disable a decoder-side motion vector derivation (DMVD) scheme for a plurality of components of a current video block of a video. The method

2470 includes, at 2474, obtaining, after the determining that the DMVD scheme is enabled, a refined motion information for the current video block by implementing the DMVD scheme. The method 2470 includes, at 2476, performing, during the implementing of the DMVD scheme, a conversion between the current video block and a bitstream representation of the video.

In some embodiments for method 2470, the determining whether to enable or disable the DMVD scheme is performed once and shared by the plurality of components. In some embodiments for method 2470, the determining whether to enable or disable the DMVD is performed multiple times for the plurality of components. In some embodiments for method 2470, the determining whether to enable or disable the DMVD is first performed for one component of the plurality of components and is then either performed for or shared with one or more remaining components of the plurality of components. In some embodiments for method 2470, the one component is a luma component or a green component. In some embodiments for method 2470, the determining whether to enable or disable the DMVD is performed for one component of the plurality of components based on information of the one component. In some embodiments for method 2470, the one component is a luma component, a chroma component, a green component, a blue component, or a red component.

Some embodiments may be described using the following clause-based format.

Clause 1. A video processing method, comprising implementing, by a processor, a decoder-side motion vector derivation (DMVD) scheme for motion vector refinement during a conversion between a current video block and a bitstream representation of the current video block by deriving parameters based on a deriving rule.

Clause 2. The technique of clause 1, wherein the parameters are derived from parameters applied to a final prediction block for the current video block.

Clause 3. The technique of clause 1, wherein the parameters are signaled in the bitstream representation.

Clause 4. The technique of clause 1, wherein the parameters are derived by the processor.

Clause 5. The technique of any of clauses 1-4, wherein the deriving rule specifies to use parameters used to deriving a final prediction block for the DMVD scheme.

Clause 6. The technique of clause 5, wherein the conversion includes calculating a predictive cost function for the current video block by first applying one of generalized bidirectional coding weights, or weights of a weighted prediction scheme or weights of a local illumination compensation scheme, temporal or spatial gradients of a bidirectional optical flow scheme and then calculating the predictive cost function.

Clause 7. The technique of clause 6, wherein the predictive cost function is a gradient function or a sum of absolute difference (SAD) cost function.

Clause 8. The technique of clause 2, wherein the parameters are parameters for a local illumination compensation of the final prediction block.

Clause 9. A video processing method, comprising selectively using a decoder-side motion vector derivation (DMVD) scheme for motion vector refinement during a conversion between a current video block and a bitstream representation of the current video block based on an enablement rule.

Clause 10. The technique of clause 9, wherein the enablement rule specifies disabling the DMVD scheme in case that the conversion uses a generalized bidirectional coding mode or a local illumination compensation mode or a weighted prediction mode or a multi-hypothesis prediction mode.

Clause 11. The technique of clause 9, wherein the enablement rule specifies to use the DMVD scheme for the current video block that is a bi-predicted block that uses unequal picture order count distances.

Clause 12. The technique of clause 9, wherein the enablement rule specifies to use the DMVD scheme based on a relationship between picture order count distances PocDis0 and PocDis1 representing two directions of bi-directional prediction of the current video block.

Clause 13. The technique of clause 12, wherein the enablement rule specifies to use the DMVD scheme in case that PocDis0=PocDis1.

Clause 14. The technique of clause 12, wherein the enablement rule specifies to use the DMVD scheme in case that PocDis0 is unequal to PocDis1.

Clause 15. The technique of clause 12, wherein the enablement rule specifies to use the DMVD scheme in case that PocDis0 multiplied by PocDis1 is less than zero.

Clause 16. The technique of any of clauses 9-14, wherein the DMVD scheme uses list0 and list1 as two reference picture lists during the conversion, and wherein list0 is a mirrored version of list1.

Clause 17. The technique of clause 15, wherein the DMVD scheme comprises using motion vector differences of list0 and list1 according to a scaling based on PocDis0 and PocDis1 distances.

Clause 18. The technique of clause 17, wherein the DMVD scheme comprises using motion vector differences of list0 are scaled to that of list1.

Clause 19. The technique of clause 17, wherein the DMVD scheme comprises using motion vector differences of list1 are scaled to that of list0.

Clause 20. The technique of any of clauses 9-14, wherein the DMVD scheme includes using reference pictures according to picture order counts of the reference pictures.

Clause 21. The technique of clause 9, wherein the enablement rule is based on dimensions of the current video block.

Clause 22. The technique of clause 21, wherein the DMVD scheme comprises a decoder-side motion vector refinement (DMVR) that is enabled in case that W*H>=T1 && H>=T2, where W and H are width and height of the current video block and T1 and T2 are rational numbers.

Clause 23. The technique of clause 21, wherein the DMVD scheme comprises a bidirectional optical (BIO) coding method that is enabled in case that W*H>=T1 && H>=T2, where W and H are width and height of the current video block and T1 and T2 are rational numbers.

Clause 24. The technique of clause 21, wherein the DMVD scheme comprises a decoder-side motion vector refinement (DMVR) that is enabled in case that H>=T1 && !(W T2 && H==T1), where W and H are width and height of the current video block and T1 and T2 are rational numbers.

Clause 25. The technique of clause 21, wherein the DMVD scheme comprises a bidirectional optical flow (BIO) coding scheme that is enabled in case that H>=T1 && !(W T2 && H==T1), where W and H are width and height of the current video block and T1 and T2 are rational numbers.

Clause 26. The technique of any of clauses 9 to 21, wherein the DMVD scheme is a decoder-side motion vector refinement (DMVR) scheme or a bidirectional optical flow (BIO) coding scheme, and wherein the DMVD scheme is disabled in case that the current video block has a width>th1 or a height>th2.

Clause 27. A technique of video processing, comprising selectively using a decoder-side motion vector derivation (DMVD) scheme for motion vector refinement during a conversion between a current video block and a bitstream representation of the current video block by applying the DMVD scheme as a sub-block level based on a rule.

Clause 28. The technique of clause 27, wherein the DMVD scheme is a decoder-side motion vector refinement (DMVR) scheme or a bidirectional optical flow (BIO) scheme.

Clause 29. The technique of clause 28, wherein the DMVD scheme is the BIO scheme and wherein the rule specifies applicability of the DMVD scheme on a sub-block by sub-block basis.

Clause 30. The technique of clause 29, wherein the current video block has a width>=LW or height>=LH, or width*height is larger than a threshold L1, where L1, L, W and H are integers, and wherein the conversion is performed by splitting the current video block into multiple sub-blocks that are further processed using the DMVD scheme.

Clause 31. The technique of clause 30, wherein the splitting includes splitting the current video block horizontally.

Clause 32. The technique of clause 30, wherein the splitting includes splitting the current video block vertically.

Clause 33. The technique of any of clauses 30-32, wherein L is signaled in the bitstream representation at a sequence parameter set level, a picture parameter set level, a picture level, a slice level a tile group level or a tile level or wherein L is implicitly signaled based on a size of the current video block or a type of picture containing the current video block or a temporal layer index of the current video block.

Clause 34. The technique of any of clauses 1-33, wherein the DMVD is applied to the current video block depending on luma or chroma type of the current video block.

Clause 35. The technique of any of clauses 1-34, wherein the conversion uses the DMVD scheme that is decided based on a decision for using DMVD for a block or a different luma or chroma type corresponding to the current video block.

Clause 36. The technique of any of clauses 1-35, wherein the DMVD scheme includes a decoder side motion vector refinement scheme or a bidirectional optical flow scheme.

Clause 37. A technique of video processing, comprising during a conversion between a current video block and a bitstream representation of the current video block, wherein the current video block uses a symmetric motion vector difference codec technique, using a decoder side motion vector derivation technique by which a motion vector for the current video block is refined during the conversion, wherein the symmetric motion vector difference codec technique uses symmetric motion vector difference derivation; and performing the conversion using the decoder side motion vector derivation technique.

Clause 38. The technique of clause 37, wherein the decoder side motion vector derivation technique includes decider side motion vector refinement.

Clause 39. The technique of any of clauses 37-38, wherein the decoder side motion vector derivation technique changes motion vector precision from N-pel used for the symmetric motion vector difference codec technique to an M-pel precision, wherein N and M are integers of fractions, and wherein N and M are equal to 1/16, 1/8, 1/4, 1/2, 1, 2, 4, 8, or 16.

Clause 40. The technique of clause 39, wherein M is less than or equal to N.

Clause 41. The technique of any of clauses 37-41, wherein the bitstream representation excludes a motion vector difference indication for the current video block and wherein the decoder side motion vector derivation technique is used to derive the motion vector difference.

Clause 42. The technique of any of clauses 37-42, wherein the bitstream representation indicates whether or not the decoder side motion vector derivation techniques and the symmetric motion vector derivation techniques are used for the conversion of the current video block.

Clause 43. The technique of any of clauses 1-42, wherein the conversion comprises generating the bitstream representation from the current video block or generating the current video block from the bitstream representation.

Clause 44. A video encoding apparatus comprising a processor configured to implement a method recited in one or more of clauses 1 to 43.

Clause 45. A video decoding apparatus comprising a processor configured to implement a method recited in one or more of clauses 1 to 43.

Clause 46. A computer readable medium having code stored thereon, the code, when executed, causing a processor to implement a method recited in any one or more of clauses 1 to 43.

Figure 26:
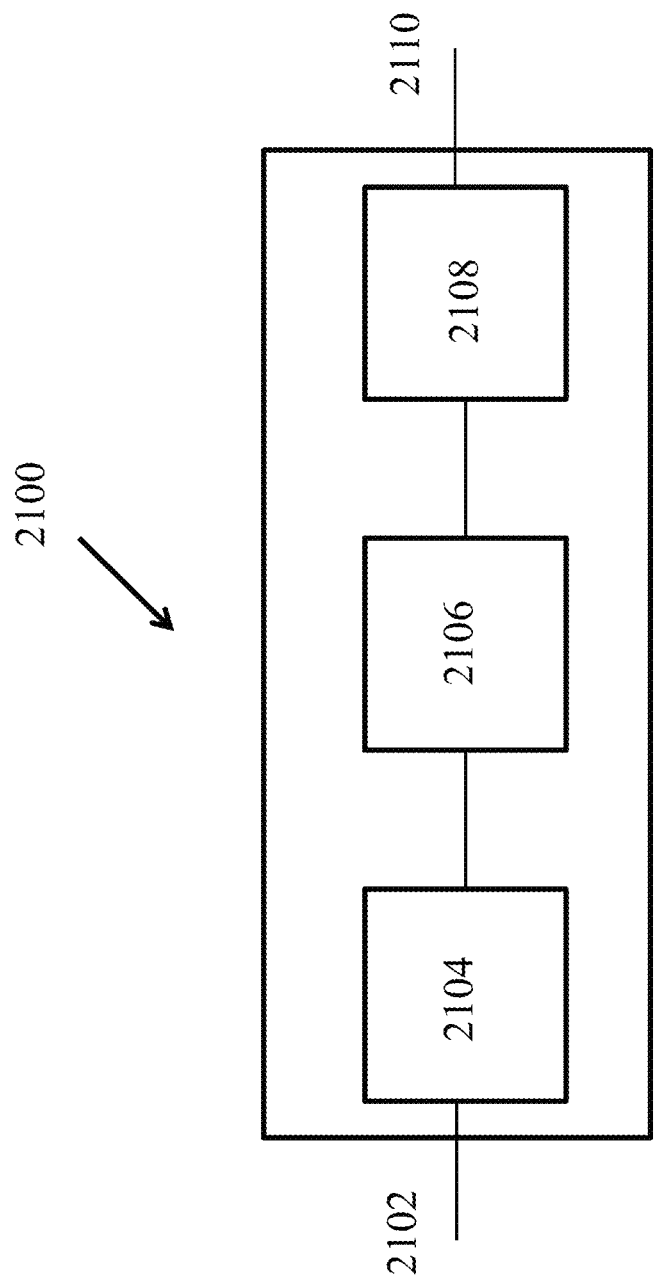
FIG. 26 is a block diagram showing an example video processing system in which various techniques disclosed herein may be implemented.

FIG. 26 is a block diagram showing an example video processing system 2100 in which various techniques disclosed herein may be implemented. Various implementations may include some or all of the components of the system 2100. The system 2100 may include input 2102 for receiving video content. The video content may be received in a raw or uncompressed format, e.g., 8 or 10 bit multi-component pixel values, or may be in a compressed or encoded format. The input 2102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2100 may include a coding component 2104 that may implement the various coding or encoding methods described in the present document. The coding component 2104 may reduce the average bitrate of video from the input 2102 to the output of the coding component 2104 to produce a coded representation of the video. The coding techniques are therefore sometimes called video compression or video transcoding techniques. The output of the coding component 2104 may be either stored, or transmitted via a communication connected, as represented by the component 2106. The stored or communicated bitstream (or coded) representation of the video received at the input 2102 may be used by the component 2108 for generating pixel values or displayable video that is sent to a display interface 2110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 27:
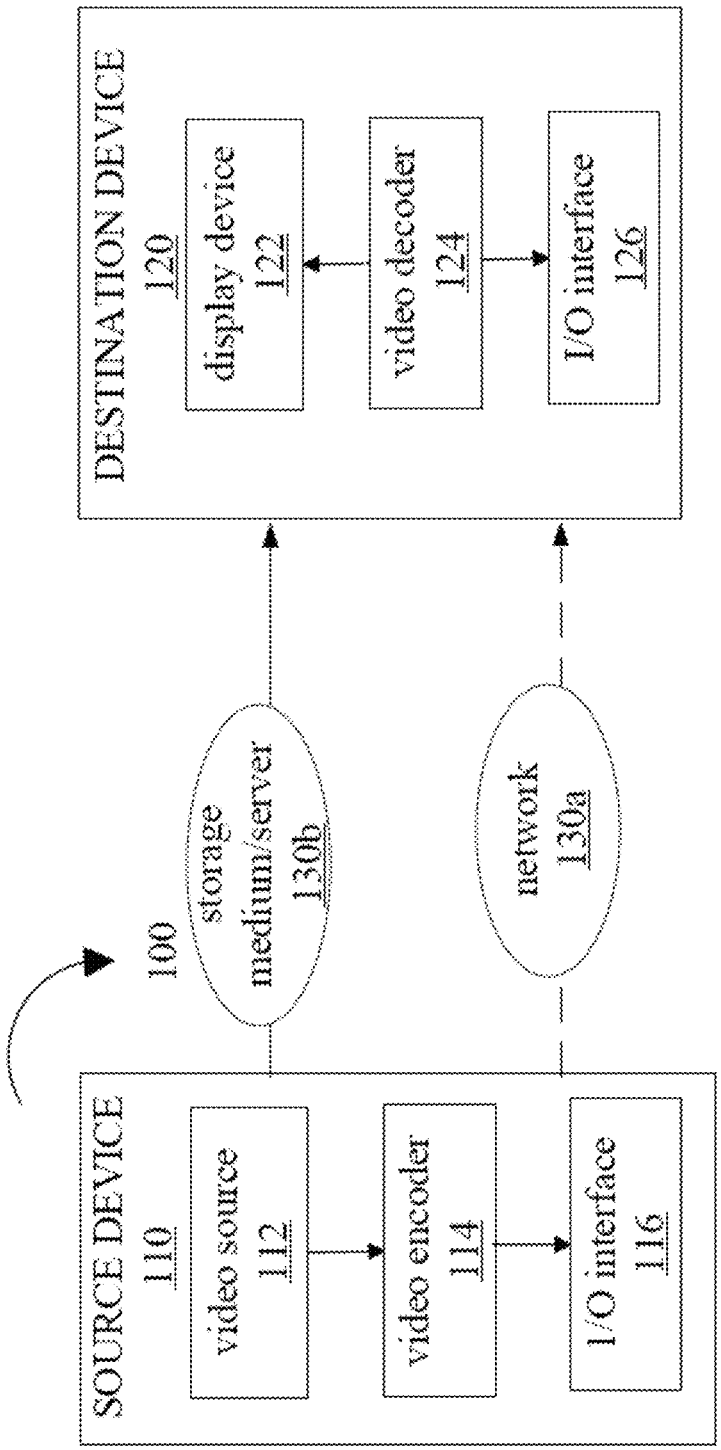
FIG. 27 is a block diagram that illustrates a video coding system in accordance with some embodiments of the present disclosure.

FIG. 27 is a block diagram that illustrates an example video coding system 100 that may utilize the techniques of this disclosure. As shown in FIG. 27, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 28:
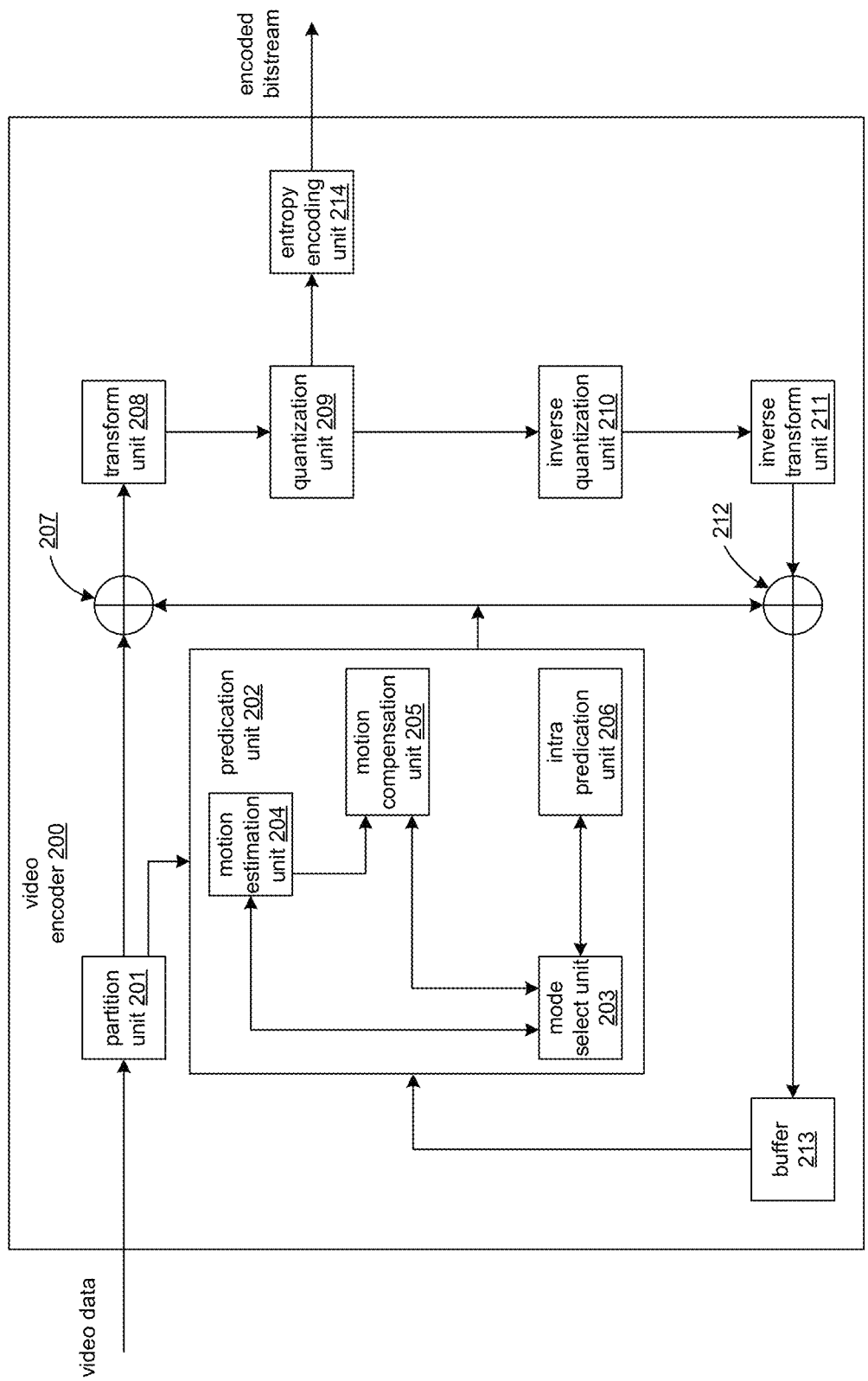
FIG. 28 is a block diagram that illustrates an encoder in accordance with some embodiments of the present disclosure.

FIG. 28 is a block diagram illustrating an example of video encoder 200, which may be video encoder 114 in the system 100 illustrated in FIG. 27.

Video encoder 200 may be configured to perform any or all of the techniques of this disclosure. In the example of FIG. 28, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 28 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 29:
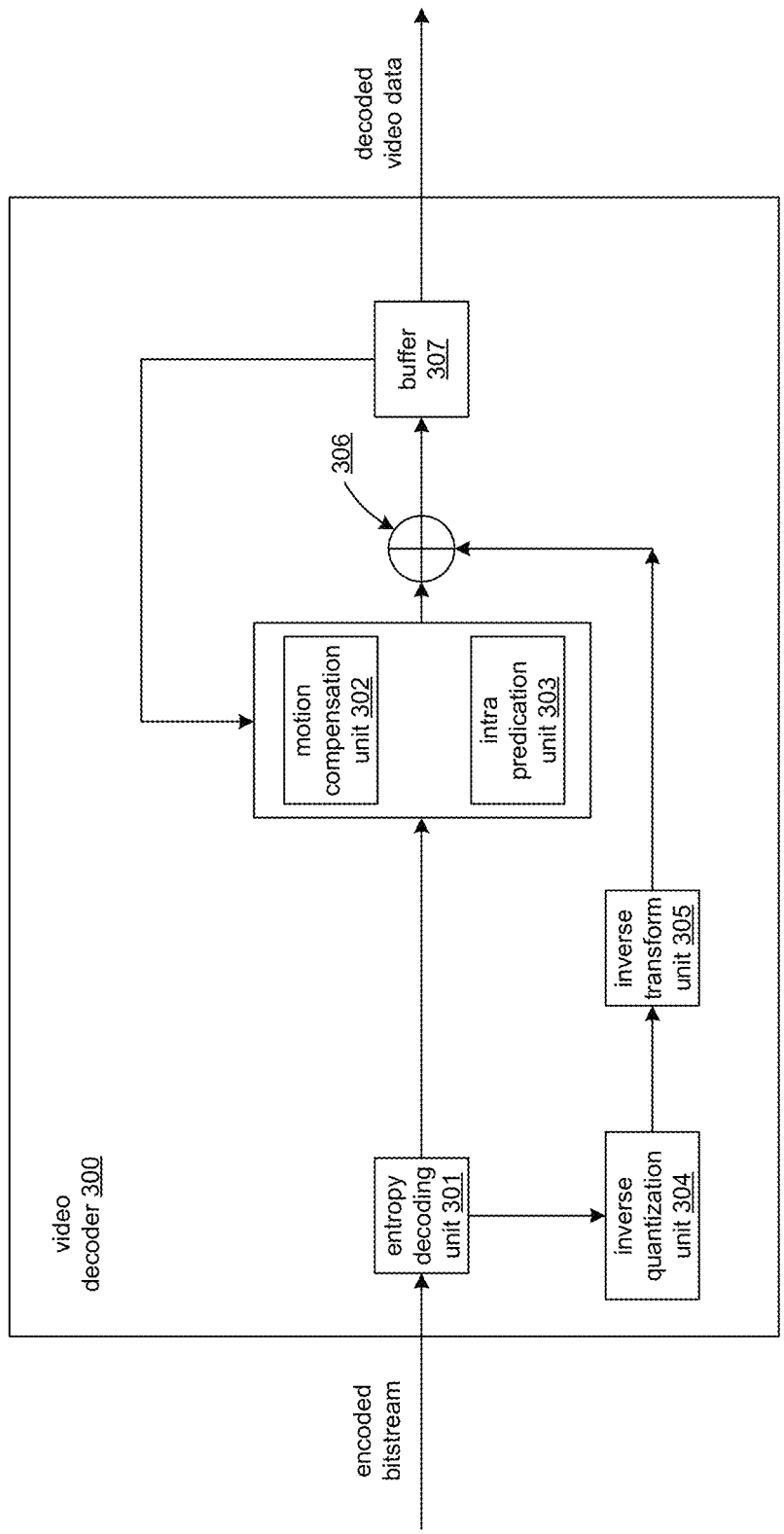
FIG. 29 is a block diagram that illustrates a decoder in accordance with some embodiments of the present disclosure.

FIG. 29 is a block diagram illustrating an example of video decoder 300 which may be video decoder 114 in the system 100 illustrated in FIG. 27.

The video decoder 300 may be configured to perform any or all of the techniques of this disclosure. In the example of FIG. 29, the video decoder 300 includes a plurality of functional components. The techniques described in this disclosure may be shared among the various components of the video decoder 300. In some examples, a processor may be configured to perform any or all of the techniques described in this disclosure.

In the example of FIG. 29, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 28).

Entropy decoding unit 301 may retrieve an encoded bitstream. The encoded bitstream may include entropy coded video data (e.g., encoded blocks of video data).

Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. A non-transitory computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A video processing method, comprising:
   making, based on a rule that uses a block dimension of a current video block of a video, a first determination on whether a first scheme is enabled or disabled for a conversion between the current video block and a bitstream of the video; wherein the first scheme is Decoder-side Motion Vector Refinement (DMVR) scheme which is used to derive a refined motion information based on a cost between at least one reference sample of list 0 and at least one reference sample of list 1;
   making, based on the same rule, a second determination on whether a second scheme is enabled or disabled for the conversion, wherein the second scheme is a bi-directional optical flow scheme; and
   performing the conversion based on the first determination and the second determination,
   wherein the first scheme and the second scheme are determined to be disabled in response to at least one of:
   a first number of samples included in the current video block being less than a second number of samples, or
   a width of the current video block being less than a value or a height of the current video block being less than the value.

2. The method of claim 1, wherein the value is 8.

3. The method of claim 1, wherein the first scheme and the second scheme are determined to be enabled based on (W*H)>=T1 and H>=T2, where W and H are respectively width and height of the current video block and T1 and T2 are rational numbers.

4. The method of claim 3, wherein T2 is 8.

5. The method of claim 1, wherein the first scheme and the second scheme are performed in a same sub-block level for the current video block.

6. The method of claim 5, wherein a determination of the sub-block size is same for the first scheme and the second scheme.

7. The method of claim 5, wherein the current video block is split vertically in response to a width of the current video block is greater than a value, and wherein a width of a sub-block of the current video block is less than or equal to the value; or the current video block is split horizontally in response to a height of the current video block is greater than a value, and wherein a height of a sub-block of the current video block is less than or equal to the value.

8. The method of claim 5, wherein the sub-block is processed by the first scheme and the second scheme in a same way as a coding block with size equal to a sub-block size.

9. The method of claim 7, wherein the value is 16.

10. The method of claim 1, wherein the current video block is a luma video block and the determining whether to enable or disable the first scheme or the second scheme is performed based on information of the luma video block and without using information of associated chroma video blocks.

11. The method of claim 5, wherein and the first scheme is a decoder-side motion vector refinement scheme and the refined motion information is obtained by applying a bilateral matching in the decoder-side motion vector refinement scheme at the sub-block level for the current video block.

12. The method of claim 5, wherein the second scheme is determined to be enabled and the refined motion information is obtained by performing a sample-wise refinement of the motion information performed at the sub-block level of the current video block in the second coding scheme.

13. The method of claim 5, wherein the second scheme is determined to be enabled or disabled at a sub-block level for the current video block.

14. The method of claim 1, wherein the conversion comprises encoding the current video block into the bitstream.

15. The method of claim 1, wherein the conversion comprises decoding the current video block from the bitstream.

16. An apparatus for processing video data comprising a processor and a non-transitory memory with instructions thereon, wherein the instructions upon execution by the processor, cause the processor to:
   make, based on a rule that uses a block dimension of a current video block of a video, a first determination on whether a first scheme is enabled or disabled for a conversion between the current video block and a bitstream of the video; wherein the first scheme is Decoder-side Motion Vector Refinement (DMVR) scheme which is used to derive a refined motion information based on a cost between at least one reference sample of list 0 and at least one reference sample of list 1;
   make, based on the same rule, a second determination on whether a second scheme is enabled or disabled for the conversion, wherein the second scheme is a bi-directional optical flow scheme; and
   perform the conversion based on the first determination and the second determination,
   wherein the first scheme and the second scheme are determined to be disabled in response to at least one of:
   a first number of samples included in the current video block being less than a second number of samples, or
   a width of the current video block being less than a value or a height of the current video block being less than the value.

17. A non-transitory computer-readable storage medium storing instructions that cause a processor to:
   make, based on a rule that uses a block dimension of a current video block of a video, a first determination on whether a first scheme is enabled or disabled for a conversion between the current video block and a bitstream of the video; wherein the first scheme is Decoder-side Motion Vector Refinement (DMVR)

scheme which is used to derive a refined motion information based on a cost between at least one reference sample of list 0 and at least one reference sample of list 1;

make, based on the same rule, a second determination on whether a second scheme is enabled or disabled for the conversion, wherein the second scheme is a bi-directional optical flow scheme; and perform the conversion based on the first determination and the second determination, wherein the first scheme and the second scheme are determined to be disabled in response to at least one of:

a first number of samples included in the current video block being less than a second number of samples, or a width of the current video block being less than a value or a height of the current video block being less than the value.

18. A non-transitory computer-readable recording medium storing a bitstream of a video which is generated by a method performed by a video processing apparatus, wherein the method comprises:

making, based on a rule that uses a block dimension of a current video block of a video, a first determination on whether a first scheme is enabled or disabled for a conversion between the current video block and a bitstream of the video; wherein the first scheme is Decoder-side Motion Vector Refinement (DMVR) scheme which is used to derive a refined motion information based on a cost between at least one reference sample of list 0 and at least one reference sample of list 1;

making, based on the same rule, a second determination on whether a second scheme is enabled or disabled for the conversion, wherein the second scheme is a bi-directional optical flow scheme; and generating the bitstream based on the first determination and the second determination, wherein the first scheme and the second scheme are determined to be disabled in response to at least one of:

a first number of samples included in the current video block being less than a second number of samples, or a width of the current video block being less than a value or a height of the current video block being less than the value.

19. The apparatus of claim 16, wherein the first scheme and the second scheme are performed in a same sub-block level for the current video block.

20. The apparatus of claim 19, wherein a determination of the sub-block size is same for the first scheme and the second scheme.

* * * * *